Oct. 11, 1966 J. H. AUER, JR., ETAL 3,278,896

TRAFFIC SIGNAL CONTROLLER OFFSET COMPUTER

Filed Sept. 3, 1963 10 Sheets-Sheet 1

INVENTORS
J. H. AUER JR. AND
L. A. ROSS

BY Forest B. Hitchcock

THEIR ATTORNEY

TRAFFIC SIGNAL CONTROLLER OFFSET COMPUTER

Filed Sept. 3, 1963 10 Sheets-Sheet 2

INVENTORS
J.H. AUER JR. AND
L.A. ROSS
BY
Forest B. Hitchcock
THEIR ATTORNEY

Oct. 11, 1966 J. H. AUER, JR., ETAL 3,278,896

TRAFFIC SIGNAL CONTROLLER OFFSET COMPUTER

Filed Sept. 3, 1963 10 Sheets-Sheet 3

FIG. 3B

OFFSET CODE

| OUTPUT | INPUT I | INPUT O | INPUT L | INPUT H |
|---|---|---|---|---|
| LIGHT | | | X | |
| OUT | | X | | |
| PRE-OUT | | X | X | |
| MED | X | X | | |
| PRE-IN | X | | X | |
| IN | X | | | |
| HEAVY OUT | | X | | X |
| PRE HEAVY OUT | | X | X | X |
| HEAVY BOTH | X | X | | X |
| PRE HEAVY IN | X | | X | X |
| HEAVY IN | X | | | X |

FIG. 3A

OCCUPANCY DIRECTION CODE

| DELAY CIRCUIT INPUT | INPUT IN | INPUT OUT | INPUT PRE IN | INPUT PRE OUT | INPUT MED |
|---|---|---|---|---|---|
| I | X | | | | X |
| O | | X | | | X |
| IO | | | | | X |
| LI | | | X | | X |
| LO | | | | X | X |

INVENTORS
J.H.AUER JR. AND
L.A.ROSS

BY Forest B. Hitchcock

THEIR ATTORNEY

TRAFFIC SIGNAL CONTROLLER OFFSET COMPUTER

INVENTORS
J.H. AUER JR. AND
L.A. ROSS
BY Forest B. Hitchcock
THEIR ATTORNEY

INVENTORS
J.H. AUER JR. AND
L.A. ROSS
BY Forest B. Hitchcock
THEIR ATTORNEY

Oct. 11, 1966 J. H. AUER, JR., ETAL 3,278,896

TRAFFIC SIGNAL CONTROLLER OFFSET COMPUTER

Filed Sept. 3, 1963 10 Sheets-Sheet 6

INVENTORS
J. H. AUER JR. AND
L. A. ROSS
BY
Forest B. Hitchcock
THEIR ATTORNEY

INVENTORS
J.H.AUER JR. AND
L.A.ROSS
BY Forest B. Hitchcock
THEIR ATTORNEY

Oct. 11, 1966 J. H. AUER, JR., ETAL 3,278,896

TRAFFIC SIGNAL CONTROLLER OFFSET COMPUTER

Filed Sept. 3, 1963 10 Sheets-Sheet 8

INVENTORS
J. H. AUER JR. AND
L. A. ROSS
BY *[signature]*
THEIR ATTORNEY

TRAFFIC SIGNAL CONTROLLER OFFSET COMPUTER

Filed Sept. 3, 1963

INVENTORS
J.H.AUER JR. AND
L.A.ROSS
BY
THEIR ATTORNEY

INVENTORS
J.H.AUER JR. AND
L.A.ROSS
BY
Forest B. Hitchcock
THEIR ATTORNEY

United States Patent Office 3,278,896

Patented Oct. 11, 1966

3,278,896

TRAFFIC SIGNAL CONTROLLER OFFSET COMPUTER

John H. Auer, Jr., and Lyle A. Ross, Rochester, N.Y., assignors to The General Signal Corporation, Rochester, N.Y., a corporation of New York Filed Sept. 3, 1963, Ser. No. 305,967
13 Claims. (Cl. 340—35)

This invention relates to traffic control systems, and more particularly to a computer for controlling offsets of traffic signals along a section of highway in accordance with demands of traffic.

Offset may be defined as the number of seconds or percent of the time cycle that the green indication appears at a given traffic control signal after a certain instant used as a time reference base. In order to progress traffic smoothly along an urban arterial highway, successive traffic signals encountered by arterial vehicular traffic should be green. This requires that the offset for each successive traffic signal be greater than the offset for the preceding traffic signal. For proper control of each traffic signal, a plurality of offsets should be provided for the signal. Any one particular offset may then be selected by energization of one or more leads from a central control point to each traffic signal controller.

To avoid congestion and facilitate arterial traffic flow, it is necessary to control signal offsets in accordance with demand on the highways. Since traffic varies with the time of day, the day of the week, weather conditions, etc., the most efficient way to achieve such control is to provide offsets for the controllers which are automatically selected in accordance with traffic demands on the highway. Although it is possible to pre-program offsets in a traffic control system, such pre-programming fails to take account of unexpected conditions; instead, pre-programming restricts operation of the controllers to a rigid schedule. This prevents the flexibility of operation which is especially desirable under adverse weather conditions, inadvertent traffic stoppages such as those due to vehicular mishaps, etc.

Another problem encountered particularly in traffic signal control along arterial highways in larger cities is that of controlling a relatively large number of traffic signals along an artery from a single control system in response to demands of traffic. Inter-connection of the signals has heretofore required apparatus of great complexity, since efficient control of signals along a small section of highway requires that all significant traffic conditions within that section be taken into account, along with significant conditions within both sections adjacent that section.

The present invention permits individual control of traffic signal offsets at each traffic signal local controller along a section of artery from a single offset computer. This is accomplished by dividing the artery into a number of arterial sections, each section encompassing a plurality of local controllers. For an artery of length sufficient to require use of a large number of local controllers, there is associated with the controllers a plurality of offset computers. Each offset computer provides offset signals for the local controllers in the arterial section associated therewith based upon actual traffic conditions within the section and within adjacent sections on either side. This is accomplished by interconnecting the offset computer for each arterial section with the offset computers for the adjacent sections on both sides, permitting synchronization of each offset computer with the offset computers on both adjacent sides. Hence, offset changes can be produced progressively along the artery, enabling traffic to flow through the artery with a minimum of delay.

A traffic control parameter which accurately reflects traffic conditions along a highway is lane occupancy. This parameter, which is described in detail in H. C. Kendall and J. H. Auer, Jr. application, Ser. No. 78,410, filed December 27, 1960, actually represents the percentage of highway which is vehicle-occupied at any given instant of time; however, since this is a spatial concept practically incapable of continuous measurement, lane occupancy is more frequently expressed as a percentage ratio of vehicle presence time to total time at a given measuring point. This ratio is a close approximation of spatial lane occupancy, provided traffic is moving along at a relatively constant speed. Besides being an accurate measure of traffic conditions, the parameter of traffic lane occupancy may readily be computed with a minimum of equipment and circuit complexity. There is no need, for example, to separately provide vehicle volume and speed measurements and then divide the volume by speed to derive density. Instead, only the vehicle presence signal of one or more presence-type vehicle detections is required, and from this the lane occupancy parameter can be computed directly. Hence, this parameter is highly useful in computing offsets.

Accordingly, one object of this invention is to provide a read time computer for producing offset signals for traffic controllers along a highway in accordance with demands of traffic.

Another object is to provide a system for computing proper offsets for a plurality of traffic signal controllers located along a section of a vehicular route based upon demands of traffic within the section and within adjacent sections.

Another object is to provide a traffic signal controller offset computer having means for substituting inputs to the computer from an operative vehicle detector for those of a detector which has failed.

Another object is to provide a traffic signal controller offset computer having means for computing lane occupancy in both directions when traffic density is substantially equal in both directions and computing lane occupancy in only a preferential direction when traffic lane occupancy in the preferential direction substantially exceeds traffic lane occupancy in the opposite direction.

Another object is to provide a traffic control system for a sectionalized artery wherein traffic signal controllers for each section are independently controlled from a separate offset computer which is dependent upon traffic conditions in adjacent sections on either side.

Another object is to provide a system for computing proper offsets for a plurality of traffic signals located along a vehicular route based upon inbound and outbound traffic lane occupancies and anticipated lane occupancies.

The invention generally contemplates traffic inbound and outbound lane occupancy comparison means for providing preferential traffic direction information, traffic lane occupancy measurement means, and encoding means responsive to the measured traffic lane occupancy and the determined preferential direction for providing offset signals in accordance therewith.

The foregoing and other objects and advantages of the invention will become apparent from the following detailed description when read in conjunction with the accompanying drawings, in which:

FIG. 3A is a chart illustrating occupancy-direction coding utilizing in the offset computer.

FIG. 3B is a chart illustrating offset coding produced by the computer.

Figure 7:
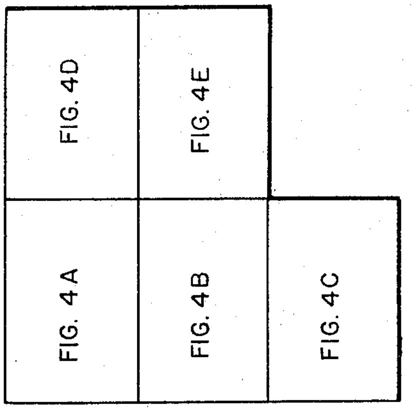
Figure 4D:
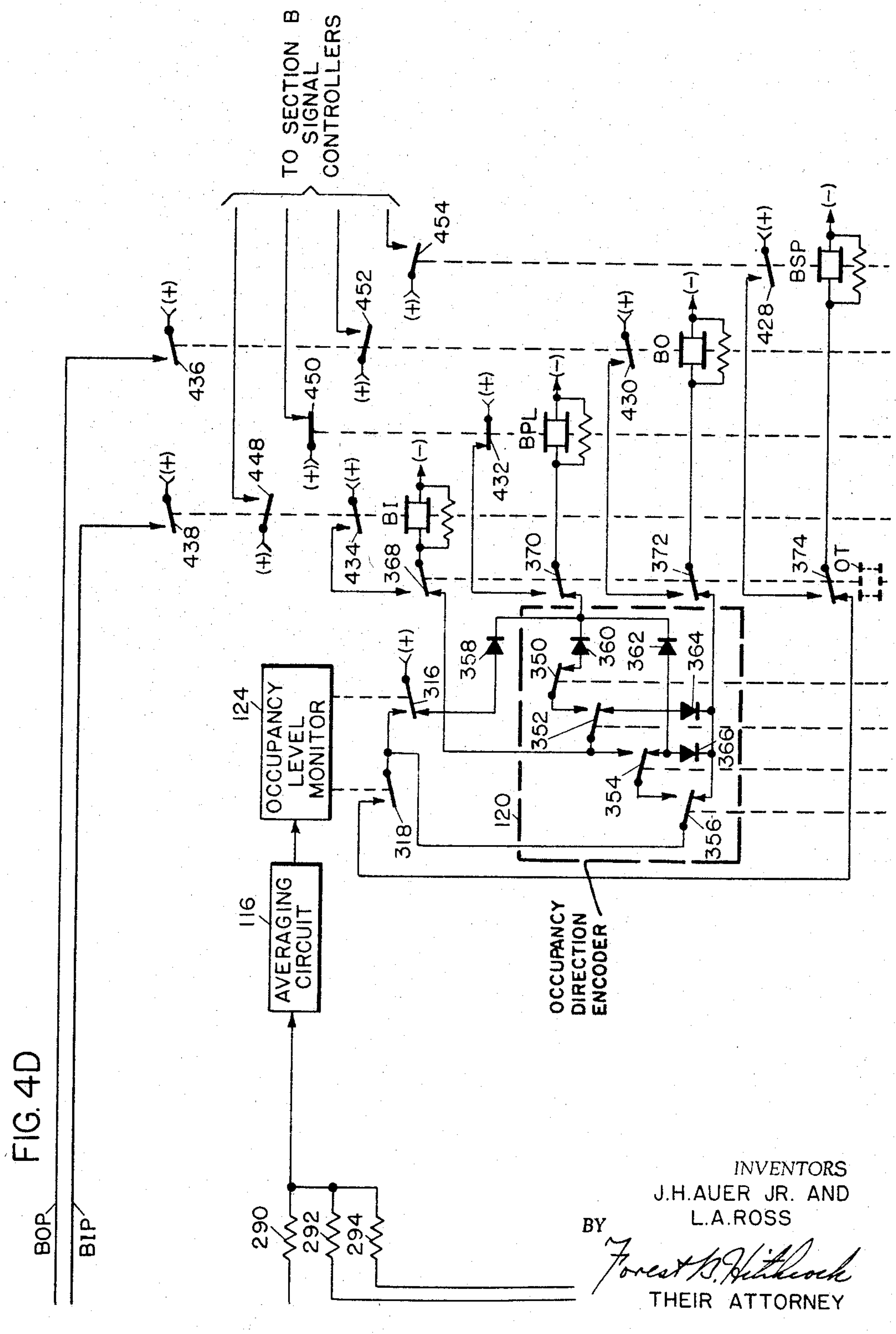
Figure 4E:
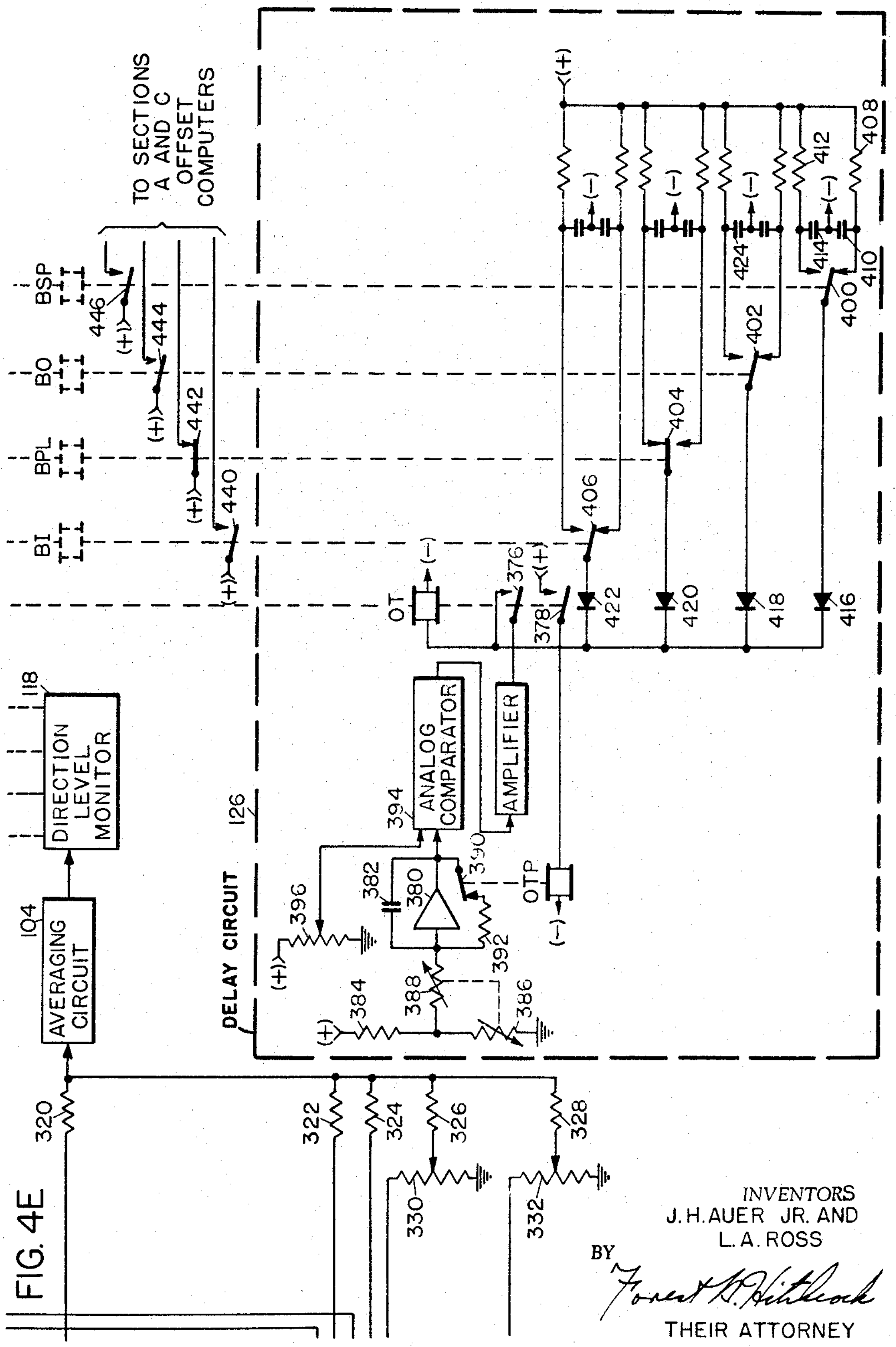

FIGS. 4A–4E, when assembled as shown in FIG. 7 constitute a part schematic and part block diagram of the offset computer.

Figure 5:
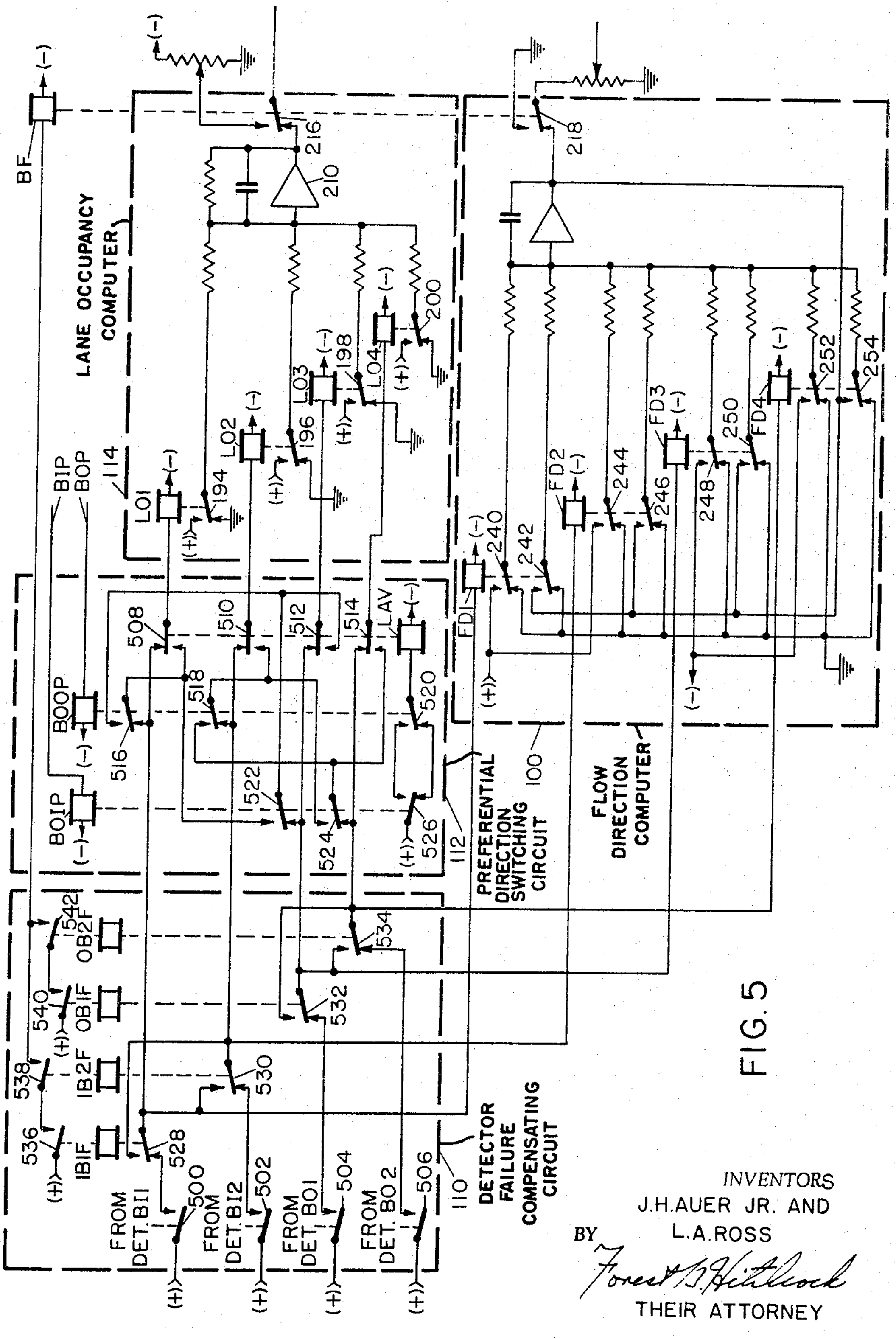

FIG. 5 is a schematic diagram of one type of traffic lane occupancy and one type of traffic flow direction computer, both of which comprise component parts of the offset computer.

Figure 6:
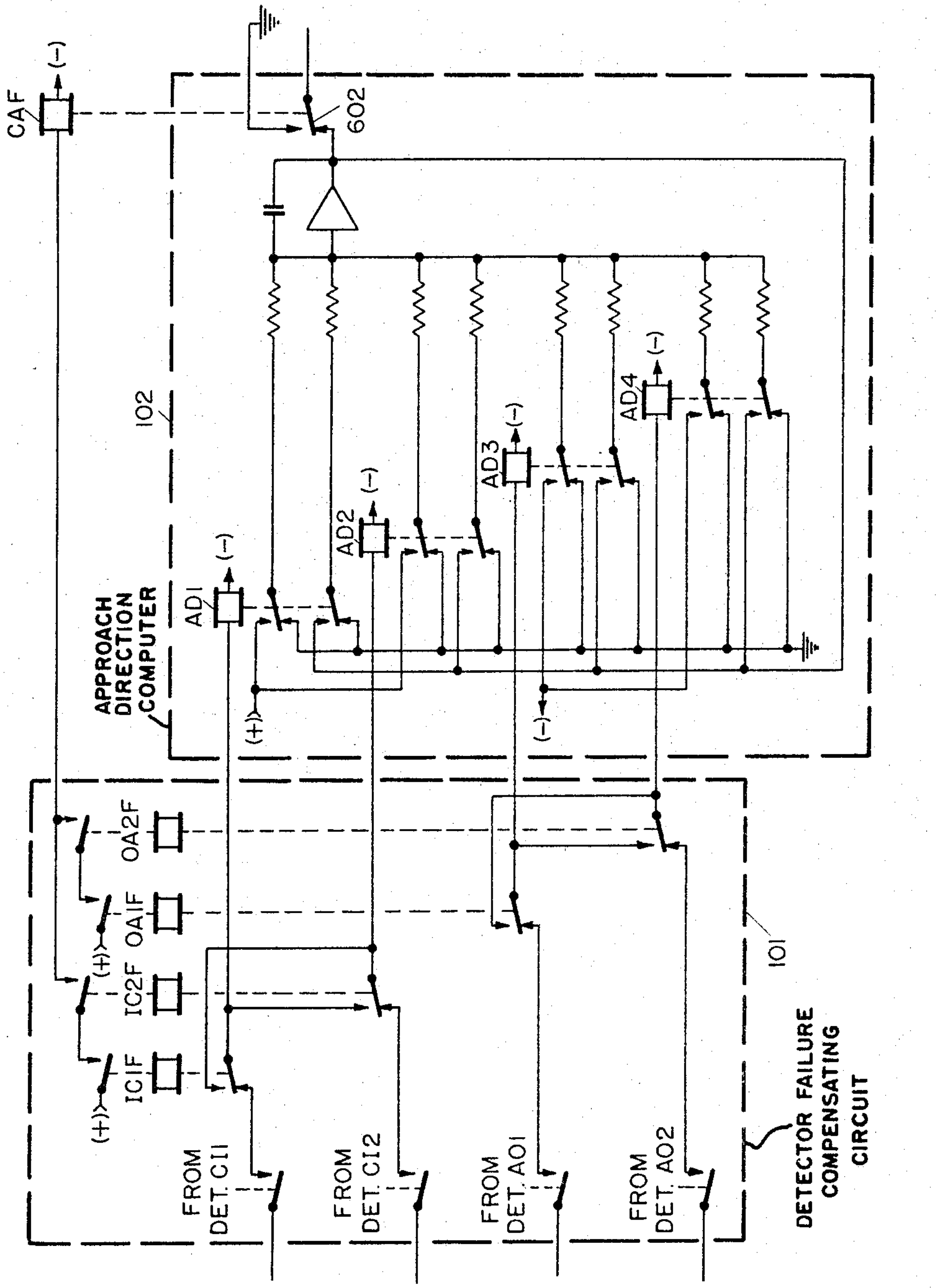

FIG. 6 is a schematic diagram of one type of traffic approach direction computer which comprises a component part of the offset computer.

FIG. 7 is a diagram illustrating how FIGS. 4A–4E are to be assembled.

Figures 4A, 8:
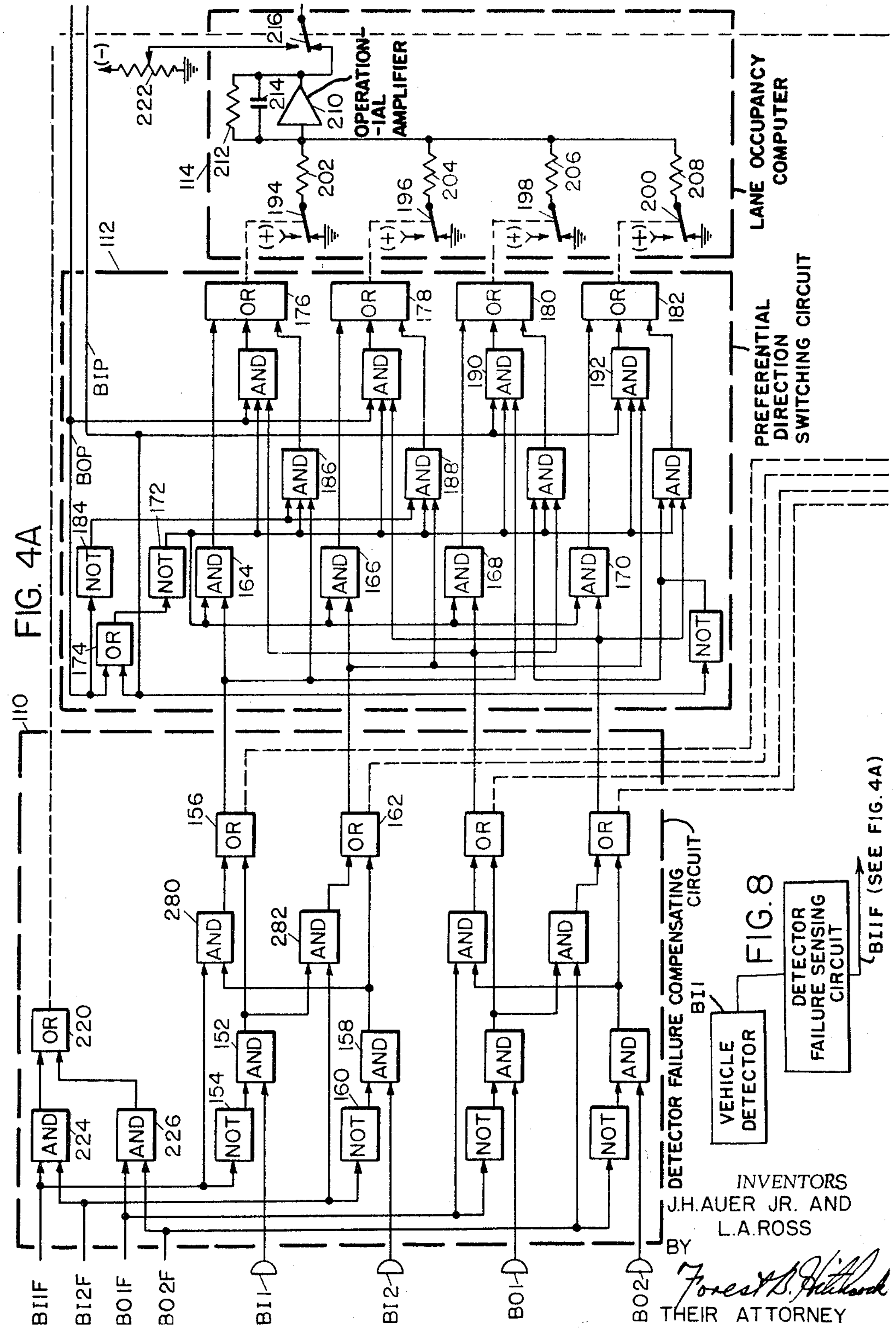

FIGURE 8 is a diagrammatic illustration of a vehicle detector failure sensing circuit.

*General description*

Figure 1:
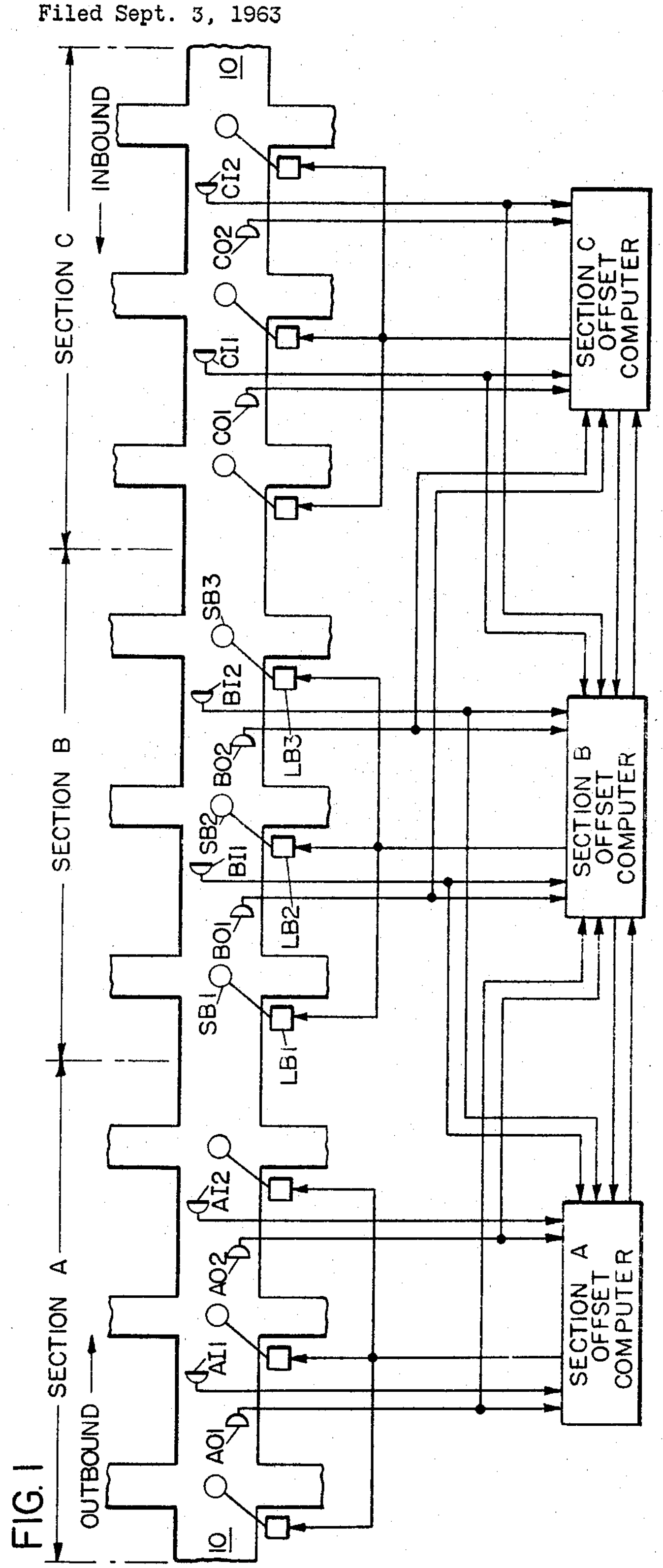
FIG. 1 is a block diagram of a sectionalized arterial highway showing section offset computer interconnections.

Turning to FIG. 1, there is shown a portion of a traffic artery 10 divided into three sections. A separate offset computer is associated with each section. Hence, a section A offset computer is associated with arterial section A, a section B offset computer is associated with arterial section B and a section C offset computer is associated with arterial section C.

Each section has a number of intersections with secondary streets. A traffic signal is located at each of these intersections, and each signal is controlled by an individual local controller. For example, in section B, traffic signals SB1, SB2 and SB3 are controlled respectively by local controllers LB1, LB2 and LB3. The local controllers in each section receive a signal from the offset computer associated therewith. For example, controllers LB1, LB2 and LB3 receive offset signals from the section B offset computer.

Suitable vehicle detectors, such as presence detectors of the type disclosed in H. C. Kendall, J. H. Auer, Jr., N. A. Bolton and K. H. Frielinghaus Patent 3,042,303 issued July 3, 1962, are situated within each section, preferably at a point just inside the intersections formed by the secondary streets crossing each section at either end of the section. At each of these locations, detection of both inbound and outbound traffic is performed. Thus, in each section, two detections are made of both inbound and outbound traffic. For example, in section B, detectors BI2 and BI1 are used for detecting traffic in the inbound direction, while detectors BO1 and BO2 are used for detecting traffic in the outbound direction. Although a single intersection is shown in each section between the detectors for the section, a plurality of intersections within the section may exist between the detectors at either end. Moreover, although for simplicity of explanation the artery is assumed to have but a single inbound and single outbound lane, for multi-lane arteries, traffic conditions in each lane could be detected separately.

In a fashion similar to that described for section B detectors AI2 and AI1 detect inbound traffic in section A at either end, while detectors AO1 and AO2 detect outbound traffic in section A at either end. Similarly, detectors CI2 and CI1 detect inbound traffic in section C at either end, while detectors CO1 and CO2 detect outbound traffic in section C at either end. Detectors AI2, AI1, AO1 and AO2 provide information to the section A offset computer, while detectors CI2, CI1, CO1 and CO2 provide information to the section C offset computer. In addition, detectors AO1 and AO2 provide section A outbound traffic information to the section B offset computer. This information is utilized by the section B offset computer to provide offset signals in section B in response to traffic in the outbound direction expected momentarily in section B. Similarly, detectors CI2 and CI1 provide section C inbound traffic information to the section B offset computer, permitting the computer to provide offset signals in section B in response to traffic in the inbound direction expected momentarily in section B. Similarly, information as to anticipated inbound traffic is provided to the section A offset computer from detectors BI2 and BI1, while information as to anticipated outbound traffic in section C is provided to the section C offset computer from detectors BO1 and BO2.

Each section offset computer provides information for the adjacent section computer on either side, pertaining to preferential offsets and lane occupancies. For example, in the event an inbound preferential offset exists in section B, due to relatively heavy traffic in the inbound direction in section B as opposed to relatively light traffic in the outbound direction in section B, this information is applied to both the sections A and C offset computers, permitting both computers to provide offset signals to the controllers in their respective arterial sections in accordance with the relatively heavy traffic direction in section B. In this instance, the preferential traffic direction, which represents the direction of heaviest traffic flow is the inbound direction. Similarly, the section B offset computer receives preferential offset signals from the section A and C offset computers. Moreover, lane occupancy information is provided from each offset computer to each adjacent offset computer, except when lane occupancy is light in both directions, in a manner already described for preferential offsets.

Thus, in the fashion shown generally in FIG. 1, offset control of traffic signals along a lengthy artery may be achieved. The system is virtually unlimited as to the number of sections into which the artery may be divided. Moreover, each section may contain a large number of local controllers, in accordance with a large number of secondary cross streets intersecting the section.

*Typical section offset computer*

Figure 2:
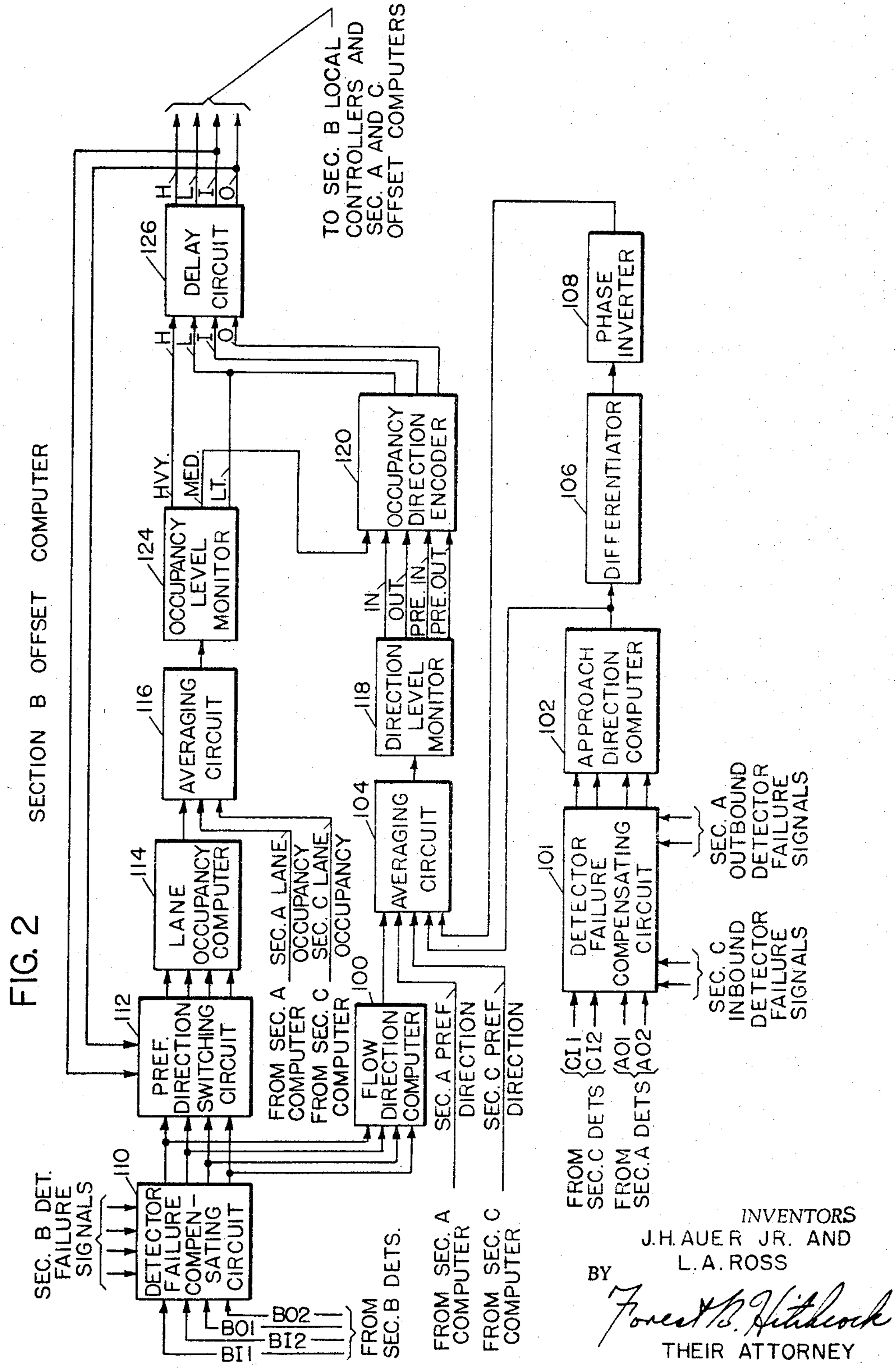
FIG. 2 is a simplified block diagram of the section B offset computer in FIG. 1.

FIG. 2 is one embodiment of a typical section offset computer. For exemplary purposes, the offset computer shown is that used with section B. The computer provides a plurality of offsets, such as eleven, with each offset corresponding to a particular traffic condition within the section. In a system having eleven offsets based upon the parameter of lane occupancy as a measure of traffic conditions, these conditions may be:

(1) Light in both directions.
(2) Moderate outbound.
(3) Expected moderate outbound.
(4) Moderate in both directions.
(5) Expected moderate inbound.
(6) Moderate inbound.
(7) Heavy outbound.
(8) Expected heavy outbound.
(9) Heavy in both directions.
(10) Expected heavy inbound.
(11) Heavy inbound.

Thus, the offset selected is a function of both the level of traffic lane occupancy and the degree of traffic directivity; that is, the balance between inbound and outbound lane occupancies. When lane occupancy is low in both directions, the light offset is selected, regardless of the degree of traffic lane occupancy unbalance. When the level of lane occupancy exceeds a predetermined minimum, the offset is selected on the basis of both traffic direction and lane occupancy. Hence, in the exemplary system, offsets 2–11 of the above list are selected as a function of traffic direction unbalance as well as lane occupancy.

If the level of traffic lane occupancy exceeds a second predetermined value, defined as moderate, which is greater than the first predetermined value, defined as light, the third lane occupancy level, defined as heavy, is selected. When this lane occupancy offset is called for, it is specified in addition to a directional offset in conditions 7–11 above. At each local controller, a manual control may be provided for permitting the local controller to either utilize or ignore the seventh through eleventh offsets. When at any controller the seventh through eleventh offset is ignored, only the directional offset being transmitted simultaneously is then selected by the controller instead. However, lane occupancy offset is inseparable from directional offsets in conditions 2–6, since these offsets are actually dual function offsets, simultaneously indicative of lane occupancy and preferential direction. If desired however, separation of these offsets can easily be achieved by one skilled in the art.

Basically, the offset computer for section B utilizes voltage analogs of lane occupancy in section B, preferential traffic direction in section B, lane occupancy in both adjacent sections C and A in the direction approaching section B and the rate of change thereof, and preferential traffic direction and lane occupancy in sections C and A, in order to provide a selected one of a plurality of offset signals to the local controllers in section B. Inputs from section B detectors BI1, BI2, BO1 and BO2 are applied to a flow direction computer 100 through a detector failure compensating circuit 110. Computer 100 provides an output voltage analog of the ratio of the difference between inbound and outbound traffic lane occupancies in section B to the total of inbound and outbound traffic lane occupancies in section B. Compensating circuit 110 provides means for substituting the signal from the operative section B detector for a particular traffic direction when the other section B detector for that direction has failed. An approach direction computer 102 having circuitry similar to that of flow direction computer 100 receives inputs from section C detectors CI1 and CI2 and from section A detectors AO1 and AO2 through a detector failure compensating circuit 101, and provides an output voltage analog of the ratio of the difference between inbound traffic lane occupancy in section C and outbound traffic lane occupancy in section A to the sum of the inbound traffic lane occupancy in section C plus the outbound traffic lane occupancy in section A. Compensating circuit 101 provides means for substituting the signal from the operative detector in section A or C for the signal from an inoperative detector in the respective section. Signals responsive to detector failures are provided from detector failure sensing means (not shown).

Output voltages from flow direction computer 100 and approach direction computer 102 are coupled to an averaging circuit 104. In addition, output voltage from approach direction computer 102 is differentiated with respect to time through a differentiator 106 and coupled to averaging circuit 104 through a phase inverter 108, which ensures proper polarity of the differential signal at the input to averaging circuit 104. The differentiator provides a voltage analog of the rate of change of the ratio of the difference between inbound traffic lane occupancy in section C and outbound traffic lane occupancy in section A to the sum of the inbound traffic lane occupancy in section C and the outbound traffic lane occupancy in section A. The latter voltage analog is indicative of the abruptness in change of traffic lane occupancy and preferential direction which may be expected momentarily in section B, while output voltage of computer 102 is an analog of the actual lane occupancy and preferential direction which may be momentarily expected in section B.

Preferential traffic direction factors from the offset computers for sections A and C are also applied to averaging circuit 104. Introduction of the section A preferential direction factor into the section B offset computer is accomplished with a coded output from the section A offset computer, while introduction of the section C preferential direction factor into the section B offset computer is accomplished with a coded output from the section C offset computer. Averaging circuit 104 algebraically sums the five input voltages applied thereto and provides an output voltage in accordance with the algebraic sum of the input voltages measured over a predetermined time interval.

A lane occupancy computer for section B is provided. This computer receives inputs in response to actuation of any detectors BI1, BI2, BO1 and BO2 from detector failure compensating circuit 110 through a preferential direction switching circuit 112 when the switching circuit is unactuated. Actuation of switching circuit 112 couples inputs either from detectors BI1 and BI2 only, or BO1 and BO2 only, to lane occupancy computer 114.

Output voltage from lane occupancy computer 114 is applied to an averaging circuit 116. In addition, voltage analogs of lane occupancy in sections A and C are coupled to averaging circuit 116 from the respective offset computers for sections A and C. The voltages applied to averaging circuit 116 are algebraically summed, and the resultant signal is averaged therein over a predetermined time interval to provide an output voltage responsive to lane occupancies in sections A, B and C.

Output voltage from averaging circuit 104, which provides a composite indication of both present and momentarily expected preferential traffic flow direction in arterial section B, is coupled through a traffic direction level monitor circuit 118 which classifies this voltage according to its level of amplitude to provide traffic flow direction information to an occupany-direction encoder 120. Thus, if the level in inbound lane occupancy exceeds the level of outbound lane occupancy in section B by more than a predetermined value, level monitor 118 provides a first output IN. If the level of outbound lane occupancy exceeds the level of inbound lane occupancy in section B by more than a predetermined value, level monitor 118 provides a second output OUT. Similarly, output PRE IN indicates that inbound traffic lane occupancy in section B is about to exceed outbound lane occupancy by a predetermined amount, although no preferential traffic direction presently exists in section B, while output PRE OUT from level monitor 118 indicates that outbound traffic lane occupancy in section B is about to exceed inbound lane occupancy by a predetermined amount, although no preferential traffic direction presently exists in section B. Further anticipatory information as to abruptness of an expected change in section B traffic lane occupancy is provided by differentiator 106, since its output voltage represents the rate of change of traffic lane occupancies in sections A and C for traffic moving toward section B only.

Output voltage from averaging circuit 116, which varies in amplitude in accordance with percentage of actual lane occupancies in sections A and C, as well as in section B, is coupled to an occupancy level monitor 124, which provides a selected output voltage in accordance with its input voltage amplitude in a manner similar to that described for direction level monitor 118. Thus, for low lane occupancies, occupancy level monitor 124 produces a single output voltage LT. For high lane occupancy levels, level monitor 124 produces a pair of output voltages, HVY and MED. In the event lane occupancy is at an intermediate or average level, only output voltage MED is provided.

Output voltages NVY and LT from lane occupancy level monitor 124 are coupled to a time delay circuit 126. Output voltage MED from lane occupancy level monitor 124 is coupled to occupancy-direction encoder 120. This encoder provides output voltages in accordance with the combination of input voltages applied thereto from lane occupancy level monitor 124 and direction level monitor 118. Three separate output voltages are provided from encoder 120 to delay circuit 126. The first voltage is coupled to an input L of delay circuit 126, which also receives energy from output LT of occupancy level monitor 124. The second voltage is coupled to an input I of the delay circuit, while the third is coupled to an input O of the delay circuit.

The occupancy-direction code produced from occupancy-direction encoder 120 is illustrated in the code chart of FIG. 3A. An X in each box of the code chart represents presence of the input signal indicated at the top of the column incorporating the box. Hence, the chart shows that for any output from encoder 120, input voltage MED must be present. Thus, input voltage MED of itself energizes delay circuit inputs I and O. Input voltage MED in connection with input voltage IN energizes delay circuit input I, while input voltage MED simultaneously with input voltage OUT energizes input O of the delay circuit. Similarly, input voltage MED simultaneously with input voltage PRE IN energizes inputs L and I of the delay circuit, while input MED simultaneously with input voltage PRE OUT energizes inputs L and O of the delay circuit.

Each input to delay circuit 126 of FIG. 2 produces a corresponding output signal from the delay circuit after a predetermined time delay subsequent to initiation of the immediately preceding output signal has elapsed. Thus, after the delay, presence of a voltage at any one or more inputs to the delay circuit appears at the corresponding output or outputs of the delay circuit. These delay circuit output voltages constitute the offset computer output voltages, in coded form. The offset code provided from delay circuit 126 is graphically illustrated in FIG. 3B in the same fashion as FIG. 3A. Hence, binary outputs may be produced from the offset computer indicative of any one of a plurality of traffic conditions, such as eleven, by energizing any combination of the offset computer output leads. These eleven conditions may represent traffic conditions which are light in both directions, moderate outbound, expected moderate outbound, moderate in both directions, expected moderate inbound, moderate inbound, heavy outbound, expected heavy outbound, heavy in both directions, expected heavy inbound and heavy inbound. Obviously, any number of outputs may be provided from the offset computer in accordance with the number of offset signals desired for coupling to the local controllers in the controlled section.

Outputs from the section B offset computer are coupled to the traffic signal controllers in section B. In addition, these outputs are also coupled to the offset computers for the adjacent sections, that is, sections A and C. Furthermore, voltages at outputs O and I of the section B offset computer are coupled to preferential direction switching circuit 112, for control thereof. Thus, in the event an offset signal indicative of moderate traffic in the outbound direction in section B is provided from delay circuit 126, switching circuit 112 disconnects section B detectors BI1 and BI2 from lane occupancy computer 114, and couples outputs from detectors BO1 and BO2 to the computer instead. Under these conditions, output voltage from computer 114 is indicative solely of section B lane occupancy in the outbound direction. Furthermore, the effectiveness of detectors BO1 and BO2 is now doubled, since signals responsive to either detector BO1 or BO2 are now provided to all inputs of lane occupancy computer 114. When the offset signal for section B is no longer that for moderate outbound traffic in section B, output O of the offset computer is deenergized, thereby permitting switching circuit 112 to again assume its normal condidition and couple signals from both inbound and outbound detectors in section B to lane occupancy computer 114.

In similar fashion, if inbound traffic lane occupancy exceeds outbound traffic lane occupancy in section B by a predetermined level, thereby indicating a moderate inbound offset in section B, switching circuit 112 is actuated so as to disconnect outputs of detectors BO1 and BO2 from lane occupancy computer 114 and instead couple outputs from detectors BI1 and BI2 to computer 114 in their place. Under these conditions, output voltage from computer 114 represents section B lane occupancy in the inbound direction only. Again, when output I of the offset computer is deenergized, switching circuit 112 reassumes its normal, or non-preferential condition, reconnecting the outbound detectors in section B to computer 114. It is well to note that in the event only both inbound detectors or only both outbound detectors are coupled to computer 114, output signals from each detector coupled thereto are doubly weighted in averaging circuit 116, while the weight of output signals from any detector in section A or C which is coupled to the lane occupancy computer of the offset computer for that section remains unchanged, assuming the preferential direction switching circuit in that offset computer remains in its normal condition.

Summarizing offset computer operation for arterial section B, traffic preferential direction voltage analogs are computed in flow direction computer 100 and approach direction computer 102 and applied to averaging circuit 104. Computer 100 provides an indication of preferential direction in section B, while computer 102 provides an indication of preferential direction between inbound traffic in section C and outbound traffic in section A. Rate of change of the preferential direction factor between the inbound direction in section C and the outbound direction in section A is also applied to averaging circuit 104, as are preferential direction factors for sections A and C. Averaging circuit 104 then provides a composite output voltage analog of the aforementioned preferential traffic directions. This voltage is then classified into one of a plurality of amplitude steps in level monitor 118, and applied to occupancy-direction encoder 120. Simultaneously, section B lane occupancy is computed in computer 114 and coupled to averaging circuit 116. Voltages indicative of lane occupancy in sections A and C are also coupled to averaging circuit 116, which then provides an output voltage analog of lane occupancies in sections A, B and C. This voltage analog is then classified into one of a plurality of amplitude steps, indicative of light, medium or heavy lane occupancy. A heavy or light lane occupancy voltage produced by level monitor 124 is coupled directly to delay circuit 126, while a medium lane occupancy voltage produced during either heavy or medium lane occupancy levels is coupled to occupancy-direction encoder 120. Encoder 120 combines input voltages coupled thereto to produce an outut voltage to delay circuit 126 indicative of eleven different traffic conditions. After a predetermined delay produced by delay circuit 126 following initiation of the most recent offset computer output signal, any input voltages coupled thereto constitute the section B offset computer output voltages. These voltages are coupled to the traffic signal local controllers in section B as well as the offset computers for sections A and C. It should be noted that the time delay produced by delay circuit 126 is initiated each time a new input voltage is coupled thereto.

In the event a detector providing an input voltage to the offset computer should fail, input voltages from the remaining detector in the same arterial section detecting traffic moving in the same direction are substituted instead. This is accomplished in failure compensating circuit 110 in the event a section B detector fails, and in failure compensating circuit 101 in the event either a section A or a section C detector fails.

In the event a preferential offset in either the outbound or inbound direction is produced from the offset computer, preferential direction switching circuit 112 disconnects the section B inbound or outbound detectors respectively from computer 114, permitting the computation of lane occupancy for section B to then be based solely upon traffic in either the outbound or inbound direction respectively.

*Description of detailed circuits—FIGURES 4A–4E*

FIGS. 4A–4E illustrate the system of FIG. 2 in greater detail. FIG. 4A shows the makeup of detector failure compensating circuit 110 interposed between detectors BI1, BI2, BO1 and BO2 and preferential direction switching circuit 112. Failure compensating circuit 110 is responsive to failure signals for the detectors in section B. These signals are coupled to switching circuit 110 through leads designated BI1F, BI2F, BO1F and BO2F, respectively. Detector BI1 provides a first input to a two-input AND circuit 152, while lead BI1F provides a second input to AND circuit 152 through a NOT circuit 154. Hence, AND circuit 152 provides an output signal when detector BI1 senses a vehicle and lead BI1F is deenergized. Output from AND circuit 152 provides a first input to an OR circuit 156, which thereupon produces a first input signal to both preferential direction switching circuit 112 and flow direction computer 100. Similarly, detector BI2 provides a first input to a two-input AND circuit 158, which receives its second input from lead BI2F through a NOT circuit 160. Hence, in the event a vehicle is sensed by detector BI2 and no signal is present on lead BI2F, AND circuit 158 provides an output signal to a first input of an OR circuit 162, which thereupon provides a second input signal to preferential direction switching circuit 112 and flow direction computer 100. In a similar fashion, a third input signal is provided to switching circuit 112 and computer 100 when detector BO1 senses a vehicle and lead BO1F is deenergized, while a fourth input signal is coupled to switching circuit 112 and flow direction computer 100 when detector BO2 senses a vehicle and lead BO2F is deenergized.

Preferential direction switching circuit 112 receives the four aforementioned outputs from detector failure compensating circuit 110, whereby each input to preferential direction switching circuit 112 provides a first input to a group of two-input AND circuits 164, 166, 168 and 170, respectively. Second inputs to each of AND circuits 164, 166, 168 and 170 are provided in parallel from a NOT circuit 172, which in turn is energized by the output of an EXCLUSIVE OR circuit 174. Preferential offset feedback signals from the output of the section B offset computer are coupled to the input of OR circuit 174 through an inbound offset lead BIP and an outbound offset lead BOP. Hence, presence of neither a separate inbound nor a separate outbound offset signal from the section B offset computer prevents an output signal from OR circuit 174. NOT circuit 172 thereupon provides a second input signal for each of AND circuits 164, 166, 168 and 170, permitting energization of respective OR circuits 176, 178, 180 and 182 therefrom, when any of the section B vehicle detectors produces an output signal.

In the event an inbound preferential offset signal is produced from the section B offset computer, OR circuit 174 provides an output voltage to NOT circuit 172, thereby preventing AND circuits 164, 166, 168 and 170 from conducting. A NOT circuit 184 responsive to outbound preferential offsets thereupon provides a first input to each of three input AND circuits 186 and 188. Second inputs to AND circuits 186 and 188 are provided by the output of OR circuit 174. Third inputs to AND circuits 186 and 188 are provided by outputs from detectors BI1 and BI2, respectively. Hence, under these conditions, a vehicle sensed by detector BI1 or BI2 produces an output voltage from AND circuit 186 or 188, which is respectively coupled to OR circuit 176 or 178.

While this inbound preferential offset is in existence, a pair of three-input AND circuits 190 and 192 each receive first input voltages from the output of the section B offset computer. Second input voltages to AND circuits 190 and 192 are provided by the output of OR circuit 174. Third input voltages to AND circuits 190 and 192 are respectively provided from detectors BI1 and BI2. Hence whenever detector BI1 or BI2 senses a vehicle, AND circuit 190 or 192 respectively couples an output voltage to in input of OR circuit 180 or 182. Hence, presence of an inbound preferential offset energizes OR circuits 176 and 180 when detector BI1 senses a vehicle, and OR circuits 178 and 182 when detector BI2 senses a vehicle.

In similar fashion, presence of an outbound preferential offset produces energization of OR circuits 176 and 180 when a vehicle is sensed by detector BO1, and produces energization of OR circuits 178 and 182 when a vehicle is sensed by detector BO2. Moreover, it can be seen that presence of an inbound preferential offset prevents signals from detectors BO1 and BO2 from reaching any of OR circuits 176, 178, 180 and 182, while presence of an outbound preferential offset prevents signals from detector BI1 and BI2 from reaching the latter OR circuits.

In the event traffic lane occupancy is moderate in both directions, both signals I and O are simultaneously produced from the section B offset computer. Under these conditions, both inputs to EXCLUSIVE OR circuit 174 are energized, preventing a voltage from appearing at the output thereof. Hence, NOT circuit 172 provides one input voltage to each of AND circuits 164, 166, 168 and 170. The second input voltage to any of the latter AND circuits thereupon energizes the respective OR circuit coupled thereto. The three-input AND circuits coupled to OR circuits 176, 178, 180 and 182 produce no output voltage under these conditions, since they each require at one of their inputs an output voltage from EXCLUSIVE OR circuit 174, which produces no output voltage at this time. Thus, simultaneous existence of both signals I and O causes preferential direction switching circuit 112 to function in a manner similar to that when no preferential offset exists.

Each OR circuit 176, 178, 180 and 182 has associated therewith a single contact 194, 196, 198 and 200 respectively. The heel of each of the aforementioned contacts is respectively coupled through a summing resistor 202, 204, 206 and 208 to the input of an operational amplifier 210. Each contact, upon energization of the OR circuit associated therewith, is coupled to a source of positive voltage; upon deenergization of the aforementioned OR circuit, the contact is grounded.

A parallel-connected feedback resistor 212 and feedback capacitor 214 are shunted across the input and output of amplifier 210. Output of computer 114 is coupled from the output of amplifier 210 through a back contact 216 operated from an OR circuit 220. In the event front contact 216 of OR circuit 220 is closed, due to failure of both inbound or both outbound detectors in section B, as is described below, output of computer 114 becomes a predetermined voltage amplitude, as selected from a voltage divider 222. In such instance, output from computer 114 does not represent a computed quantity.

Detector failure leads BI1F and BI2F provide both inputs to a two-input AND circuit 224. Similarly, detectoı failure leads BO1F and BO2F provide both inputs to a two-input AND circuit 226. Outputs from both AND circuits 224 and 226 are coupled to OR circuit 220. Hence, failure of both section B outbound detectors provides a fixed output voltage from lane occupancy computer 114 by closing front contact 216.

Lane occupancy computer 114 provides an output voltage analog of lane occupancy in section B in the following manner. Assuming no preferential offset exists, and assuming all section B detectors are operating, input voltages from each section B detector are coupled to the input of operational amplifier 210 through a separate summing resistor upon closing the contact associated therewith. Thus, when any one of these contacts is closed, voltage is applied to the input of operational amplifier 210. Since operational amplifier 210 is shunted by a resistor 212, those skilled in the art will recognize that output voltage from amplifier 210 is directly proportional to the ratio of the ohmic value of feedback resistor 212 to the ohmic value of the summing resistor receiving an input voltage. In the event current is coupled through two summing resistors simultaneously as a result of two section B detectors sensing a vehicle simultaneously, the ohmic value of summing resistance in the aforementioned ratio is halved, assuming the summing resistors are all of equal ohmic value. Similarly, if three detectors each sense a vehicle simultaneously, ohmic value of the total summing resistance in computer 114 is one-third of that of any single summing resistor, etc. Thus, as the number of detectors simultaneously sensing separate vehicles increases, output voltage from computer 114 increases in proportion to the number of detectors simultaneously providing inputs to the computer, since feedback resistor 212 remains constant while total summing resistance decreases in an inversely proportional relationship to the number of detectors simultaneously sensing separate vehicles. Capacitor 214 shunted across resistor 212 provides time averaging of the output voltage from amplifier 210 by furnishing storage means for output voltage from the amplifier. Thus, what would otherwise be abrupt output voltage changes from amplifier 210 caused by switching of the contacts on the input side of the amplifier are smoothed into a gradually varying D.C. voltage. Obviously, this smoothing could alternatively be accomplished by providing an RC filtering circuit on the output side of amplifier 210.

That output voltage of computer 114 provides a voltage analog of lane occupancy of arterial section B may be proven mathematically in the following manner:

Let $T=$ any fixed time interval.

Let the percent of time interval T in which front contact 194 is closed $=P_A$.

Let the percent of time interval T in which front contact 196 is closed $=P_B$.

Let the percent of time interval T in which front contact 198 is closed $=P_C$.

Le the percent of time interval T in which front contact 200 is closed$=P_D$.

Let $t_A=$actual time in interval T during which front contact 194 is closed.

Let $t_B=$actual time in interval T during which front contact 196 is closed.

Let $t_C=$actual time in interval T during which front contact 198 is closed.

Let $t_D=$actual time in interval T during which front contact 200 is closed.

Hence, $P_A=$lane occupancy sensed by detector BI1, which$=t_A/T$.

$P_B=$lane occupancy sensed by detector BI2 which$=t_B/T$, $P_C=$lane occupancy sensed by detector BO1, which$=t_C/T$, and $P_D=$lane occupancy sensed by detector BO2, which$=t_D/T$.

Let $E_1=$the positive reference voltage amplitude.

Let $E_2=$output voltage amplitude from amplifier 210.

Let $C=$capacitance value of capacitor 214.

Let $R_A=$ohmic value of resistor 202.

Let $R_B=$ohmic value of resistor 204.

Let $R_C=$ohmic value of resistor 206.

Let $R_D=$ohmic value of resistor 208.

Let $R_f=$ohmic value of resistor 212.

Let $I_A=$average current through resistor 202 during time T.

Let $I_B=$average current through resistor 204 during time T.

Let $I_C=$average current through resistor 206 during time T.

Let $I_D=$average current through resistor 208 during time T.

Let $I_f=$average current through resistor 212 during time T.

Let $Q=$total charge applied to capacitor 214 during time T.

Hence, total charge applied to capacitor 214 during time T is $$Q=I_At_A+I_Bt_B+I_Ct_C+I_Dt_D+I_fT$$

Since $$I_A=\frac{E_1}{R_A},\ I_B=\frac{E_1}{R_B},\ I_C=\frac{E_1}{R_C},\ I_D\frac{E_1}{R_D}$$

and $$I_f=\frac{E_2}{R_f}$$

then $$Q=\frac{E_1}{R_At_A}+\frac{E_1}{R_Bt_B}+\frac{E_1}{R_Ct_C}+\frac{E_1}{R_Dt_D}+\frac{E_2}{R_fT}$$

Since $P=t/T$ generally, then $t=PT$. Hence $$Q=\frac{E_1}{R_A}P_AT+\frac{E_1}{R_B}P_BT+\frac{E_1}{R_C}P_CT+\frac{E_1}{R_D}P_DT+\frac{E_2}{R_f}T$$

$$(1)\qquad =E_1T\left(\frac{P_A}{R_A}+\frac{P_B}{R_B}+\frac{P_C}{R_C}+\frac{P_D}{R_D}\right)+E_2T\left(\frac{1}{R_f}\right)$$

Assuming the value of capacitor 214 is sufficiently large, the change in amplitude of voltage $E_2$ during interval T is sufficiently reduced so that the total charge applied to the capacitor during time T, as expressed by Equation 1 is within a fraction of a percentage of the actual value. Assuming further that the repetitive operation of contacts 194, 196, 198 and 200 remains substantially uniform for a sufficiently large time interval, voltage $E_2$ approaches an equilibrium value such that the change of charge on capacitor 214 during time interval T is zero and Equation 1 becomes $$O=E_1T\left(\frac{P_A}{R_A}+\frac{P_B}{R_B}+\frac{P_C}{R_C}+\frac{P_D}{R_D}\right)+E_2T\left(\frac{1}{R_f}\right)$$

and $$E_2=-E_1\frac{\frac{P_A}{R_A}+\frac{P_B}{R_B}+\frac{P_C}{R_C}+\frac{P_D}{R_D}}{\frac{1}{R_f}}$$

Letting $R_A-R_B=R_C=r$, then $$E_2=-E_1\frac{\frac{P_A+P_B+P_C+P_D}{r}}{\frac{1}{R_f}}$$

$$=-E_1\frac{R_f}{r}(P_A+P_B+P_C+P_D)$$

Letting $R_f=r/n$ where $n$ can be any number, such as the number of detector inputs to amplifier 210, here four, then $$E_2=-E_1\frac{\frac{r}{4}}{r}(P_A+P_B+P_C+P_D)$$

$$=-E_1\frac{P_A+P_B+P_C+P_D}{4}$$

Thus, computer 114 provides an output voltage of amplitude directly proportional to absolute lane occupancy as measured by the detectors in section B. Obviously, this can also be accomplished by the computer for any number of inputs from any number of detectors, corresponding either to single inbound and outbound lanes or a plurality of inbound and outbound lanes.

In the event detector BI1 senses a vehicle and lead BI1F is not energized, OR circuit 156 provides a first input voltage to flow direction computer 100 by operating a pair of contacts 240 and 242. In the event detector BI2 senses a vehicle and lead BI2F is deenergized, a voltage produced by OR circuit 162 is coupled to a second input of computer 100 by actuating a pair of contacts 244 and 246. In similar fashion, when detector BO1 senses a vehicle and lead BO1F is deenergized, a third input voltage to computer 100 is provided by actuating a pair of contacts 248 and 250, while when detector BO2 senses a vehicle and lead BO2F is deenergized, a fourth input voltage is coupled to computer 100 by actuating a pair of contacts 252 and 254. The heels of contacts 240, 244, 248 and 252 are each coupled to the input side of an operational amplifier 256 through respective summing resistors 260, 262, 264 and 266. The heels of contacts 242, 246, 250 and 254 are each coupled to the input of amplifier 256 through respective feedback resistors 268, 270, 272 and 274. Within computer 100, the back contacts of each of the contacts resistively coupled to the input of operational amplifier 256 are grounded. Front contacts 240 and 244 are each coupled to the source of positive voltage, while front contacts 248 and 252 are each coupled to the source of negative voltage. Front contacts 242, 246, 250 and 254 are each coupled to the output of operational amplifier 256. A feedback capacitor 258 is shunted across the input and output of amplifier 256.

Output of computer 100 is coupled from the output of amplifier 256 through a back contact 218 operated from OR circuit 220, and through a series-connected voltage divider 276. In normal operation, a back contact 218 is closed, providing an output voltage from computer 100 which is a predetermined fraction of the output voltage amplitude from amplifier 256, as selected by the setting of voltage divider 276. In the event front contact 218 of OR circuit 220 is closed, due to failure of both detectors sensing traffic in either direction in section B, as previously described, output of computer 100 becomes zero volts, since front contact 218 grounds the energized side of voltage divided 276. In such instance, output from computer 100 obviously does not represent a computed quality, nor does it influence overall computed traffic flow direction in the offset computer, except to require that in the event a preferential traffic direction does exist, other flow direction signals applied to the offset computer from adjacent computers must be of somewhat greater amplitude than when all section B detectors are operative, in order to produce a preferential direction voltage from the section B offset computer. The zero output voltage condition of flow direction computer 100 simulates a balance condition, since it can only be created by computer 100 when the inbound and outbound lane occupancies in section B are equal, provided of course that at least one inbound and one outbound detector are operating in section B.

Output signals from either detector BI1 or BI2 provide positive input voltages to amplifier 256, while output signals from either detector BO1 or BO2 provide negative input voltages to amplifier 256. In the event more than one detector senses a separate vehicle at the same time, input voltages to the amplifier are algebraically summed through the network comprising the current-carrying summing resistors.

Output from computer 100 represents a fraction comprising inbound lane occupancy minus outbound lane occupancy divided by inbound lane occupancy plus outbound lane occupancy. Positive inbound lane occupancy is provided in the fraction numerator by positive input voltages through resistors 260 and 262. Since presence detectors are used in the system, during the entire interval in which a vehicle is sensed by an inbound presence detector, a positive increment of charge is applied to capacitor 258. Similarly, negative outbound lane occupancy is provided from the negative voltage source through either resistor 264 or 266, during the entire interval in which a vehicle is sensed by the outbound presence detector associated therewith. To obtain the sum of inbound and outbound lane occupancies in the denominator of the fraction, feedback voltage is provided through any of resistors 268, 270, 272 or 274, depending upon which of the vehicle detectors is sensing a vehicle, during the entire interval in which the detector senses the vehicle.

The foregoing may be proven mathematically as follows:

Let $T$=any fixed time interval.

Let the percent of time interval T in which front contacts 240 and 242 are closed=$P_A$.

Let the percent of time interval T in which front contacts 244 and 246 are closed=$P_B$.

Let the present of time interval T in which front contacts 248 and 250 are closed=$P_C$.

Let the percent of time interval T in which front contacts 252 and 254 are closed=$P_D$.

Let $t_A$=actual time in interval T during which front contacts 240 and 242 are closed.

Let $t_B$=actual time in interval T during which front contacts 244 and 246 are closed.

Let $t_C$=actual time in interval T during which front contacts 248 and 250 are closed.

Let $t_D$=actual time in interval T during which front contacts 252 and 254 are closed.

Hence, $P_A$=inbound lane occupancy sensed by detector BI1, which=$t_A/T$.

$P_B$=inbound lane occupancy sensed by detector BI2, which=$t_B/T$, $P_C$=outbound lane occupancy sensed by detector BO1, which=$t_C/T$, *and*

$P_D$=outbound lane occupancy sensed by detector BO2, which=$t_D/T$.

Let $E_1$=the positive reference voltage amplitude

Let $-E_1$=the negative reference voltage amplitude

Let $E_2$=output voltage amplitude from amplifier 256.

Let $R_A$=ohmic value of resistor 260.

Let $R_B$=ohmic value of resistor 262.

Let $R_C$=ohmic value of resistor 264.

Let $R_D$=ohmic value of resistor 266.

Let $R_{fA}$=ohmic value of resistor 268.

Let $R_{fB}$=ohmic value of resistor 270.

Let $R_{fC}$=ohmic value of resistor 272.

Let $R_{fD}$=ohmic value of resistor 274.

Let $I_A$=average current through resistor 260 during time T.

Let $I_B$=average current through resistor 262 during time T.

Let $I_C$=average current through resistor 264 during time T.

Let $I_D$=average current through resistor 266 during time T.

Let $I_{fA}$=average current through resistor 268 during time T.

Let $I_{fB}$=average current through resistor 270 during time T.

Let $I_{fC}$=average current through resistor 272 during time T.

Let $I_{fD}$=average current through resistor 274 during time T.

Let $Q$=total charge applied to capacitor 258 during time T.

Hence, total charge applied to capacitor 258 during time T is $$Q=(I_A+I_{fA})t_A+(I_B+I_{fB})t_B+(I_C+I_{fC})t_C+(I_D+I_{fD})t_D$$

Since $$I_A=\frac{E_1}{R_A},\ I_B=\frac{E_1}{R_B},\ I_C=\frac{-E_1}{R_C},\ I_D=\frac{-E_1}{R_D}$$

and $$\text{If } A=\frac{E_2}{R_{fA}},\ I_{fB}=\frac{E_2}{R_{fB}},\ I_{fC}=\frac{E_2}{R_{fC}},\ \text{and } I_{fD}=\frac{E_2}{R_{fD}}$$

then $$Q=\left(\frac{E_1}{R_A}+\frac{E_2}{R_{fA}}\right)t_A+\left(\frac{E_1}{R_B}+\frac{E_2}{R_{fB}}\right)t_B+\frac{-E_1}{R_C}+\frac{E_2}{R_{fC}}\Big)t_D+\left(\frac{-E_1}{R_D}+\frac{E_2}{R_{fC}}\right)t_D$$

Since $P=t/T$ generally, then $t=PT$. Hence, $$2Q=\left(\frac{E_1}{R_A}+\frac{E_2}{R_{fA}}\right)P_AT+\left(\frac{E_1}{R_B}+\frac{E_2}{R_{fB}}\right)P_BT+\left(\frac{-E_1}{R_C}+\frac{E^2}{R_{fC}}\right)P_CT+\left(\frac{-E_1}{R_D}+\frac{E_2}{R_{fD}}\right)P_DT$$

Assuming the value of capacitor 258 is sufficiently large, the change in amplitude of voltage $E_2$ during interval T is sufficiently reduced so that the total charge applied to the capacitor during time T, as expressed by Equation 2 is within a fraction of a percentage of the actual value. Assuming further that the repetitive operation of contacts 240, 242, 244, 246, 248, 250, 252 and 254 remains substantially uniform for a sufficiently large time interval, voltage $E_2$ approaches an equilibrium value such that the change of charge on capacitor 258 during time interval T is zero. Assuming also that $R_{fA}=R_{fB}=R_{fC}=R_{fD}=R_f$, then Equation 2 becomes $$O=\frac{E_1P_A}{R_A}+\frac{E_2P_A}{R_f}+\frac{E_1P_B}{R_B}+\frac{E_2P_B}{R_f}-\frac{E_1P_C}{R_C}+\frac{E_2P_C}{R_f}-\frac{E_1P_D}{R_D}+\frac{E_2P_D}{R_f}$$

Hence, $$E_2=-E_1\frac{\frac{P_A}{R_A}\frac{P_B}{R_B}}{\frac{P_A+P_B+P_C+P_D}{R_f}}+E_1\frac{\frac{P_C}{R_C}+\frac{P_D}{R_D}}{\frac{P_A+P_B+P_C+P_D}{R_f}}$$

$$=-E_1\frac{\left(\frac{P_A}{R_A}+\frac{P_B}{R_B}\right)\cdot\left(\frac{P_C}{R_C}+\frac{P_D}{R_D}\right)}{\frac{P_A+P_B+P_C+P_D}{R_f}}$$

Letting $R_A=R_B=R_C=R_D=r$, then $$E_2=-E_1\frac{\frac{(P_A+P_B)-(P_C+P_D)}{r}}{\frac{P_A+P_B+P_C+P_D}{R_f}}$$

$$=-E_1\frac{R_f}{r}\frac{(P_A+P_B)-(P_C+P_D)}{(P_A+P_B)+(P_C+P_D)}$$

Letting $R_f=r$, then $$E_2=-E_1\frac{(P_A+P_B)-(P_C+P_D)}{(P_A+P_B)+(P_C+P_D)} \quad (3)$$

Since ½ $(P_A+P_B)$ represents average inbound lane occupancy, and ½ $(P_C+P_D)$ represents average outbound lane occupancy, Equation 3 can be rewritten as follows:

$$E_2=-E_1\frac{\frac{1}{2}(P_A+P_B)-\frac{1}{2}(P_C+P_D)}{\frac{1}{2}(P_A+P_B)+\frac{1}{2}(P_C+P_D)}$$

Thus, computer 100 provides an output voltage of amplitude directly proportional to average inbound lane occupancy minus average outbound lane occupancy divided by average inbound lane occupancy plus average outbound lane occupancy. Obviously, this can also be accomplished by the computer for any number of inputs from any number of detectors, corresponding either to single inbound and outbound lanes or a plurality of inbound and outbound lanes.

As previously mentioned, detector failure compensating circuit 110 provides means whereby inputs to computers 114 and 100 may be provided from an operative detector to replace signals from an inoperative detector detecting vehicles travelling in the same direction. Failure signals for any detector may be provided from a separate failure detection circuit associated with each individual detector. This circuit energizes the detector failure lead associated with the failed detector. In the circuit of FIG. 4A, failure leads BL1F, BL2F, BO1F and BO2F are associated respectively with detectors BI1, BI2, BO1 and BO2.

One type of circuit for providing a signal indicative of a detector failure may comprise a timing circuit for energizing the failure detection lead associated with a particular detector when no change in condition of the detector occurs during an unduly long time interval. Thus, the failure detection lead is energized when either a vehicle or no vehicle is sensed by the associated detector for an unduly long time interval. The duration of this unduly long interval may be varied by a clock throughout an entire 24 hour period so as to compensate the interval in accordance with periods of normally heavy and normally light traffic flow. The clock, which may complete its cycle through any suitable interval, such as 24 hours or seven days, thereby enables programming of the timer so that the unduly long time interval sensed by the timer is adjusted to be much longer at times traffic conditions are normally light than at times traffic conditions are normally heavy. One such timing circuit is described in detail in a prior application of John H. Auer, Jr. et al., Ser. No. 292,584. A suitable vehicle detector failure sensing circuit providing energization of an output lead in the event of failure of a detector is illustrated diagrammatically in FIGURE 8.

In the event a detector failure lead is energized, no signal is produced from the NOT circuit energized therefrom. However, each detector failure circuit provides a first input to a separate AND circuit. Hence, detector failure lead BI1F provides a first input to a two-input AND circuit 280. Similarly, detector failure lead BI2F provides a first input to a two-input AND circuit 282. A second input to AND circuit 282 is provided by the output of AND circuit 152, while a second input to AND circuit 280 is provided by an output of AND circuit 158. By this circuitry, output signals from detector BI1 and BI2 may be substituted for each other upon energization of a detector failure lead for an inbound detector. Similar circuitry is used for substituting outputs from detectors BO1 and BO2 for each other upon energization of a detector failure lead for an outbound detector.

In operation, assume detector BI1 has failed. In a manner previously described, detector failure lead BI1F is energized. Hence NOT circuit 154 provides no output voltage to one of the inputs of two-input AND circuit 152. However, the first input to AND circuit 280 is energized thereby. When detector BI2 then senses a vehicle, the second input to two-input AND circuit 280 is energized, and an output voltage is thereby coupled to OR circuit 156. Simultaneously, the output voltage is also produced from OR circuit 162. Thus it is obvious that output voltages from detector BI2 also provide output voltages from OR circuit 156 which correspond to detections of a vehicle by detector BI1. In this fashion, output voltages from detector BI2 are substituted for output voltages from detector BI1 when detector BI1 has failed.

In similar fashion, assuming detector BI2 has failed, detector failure lead BI2F is energized, and two-input AND circuit 158 now receives no input voltage at one of its input terminals since NOT circuit 160 prevents energization thereof. However, one of the inputs of two-input AND circuit 282 receives energization from detector failure lead BI2F. The second input to AND circuit 282 is energized by output from AND circuit 152. This circuit produces output signals in response to detections of a vehicle by detector BI1. OR circuit 162 is thus energized by output voltages from detector BI1. In this fashion therefore, output voltages from detector BI1 are substituted for output voltages from detector BI2 when detector BI2 has failed. In like fashion, outputs from detectors BO1 and BO2 are substituted for each other upon failure of one or the other outbound detector.

In the event of failure of both inbound or both outbound detectors, OR circuit 220 is energized, as previously explained, closing front contacts 216 and 218. This causes separate predetermined output voltage amplitudes to be produced from lane occupancy computer 114 and flow direction computer 100.

Figure 4B:
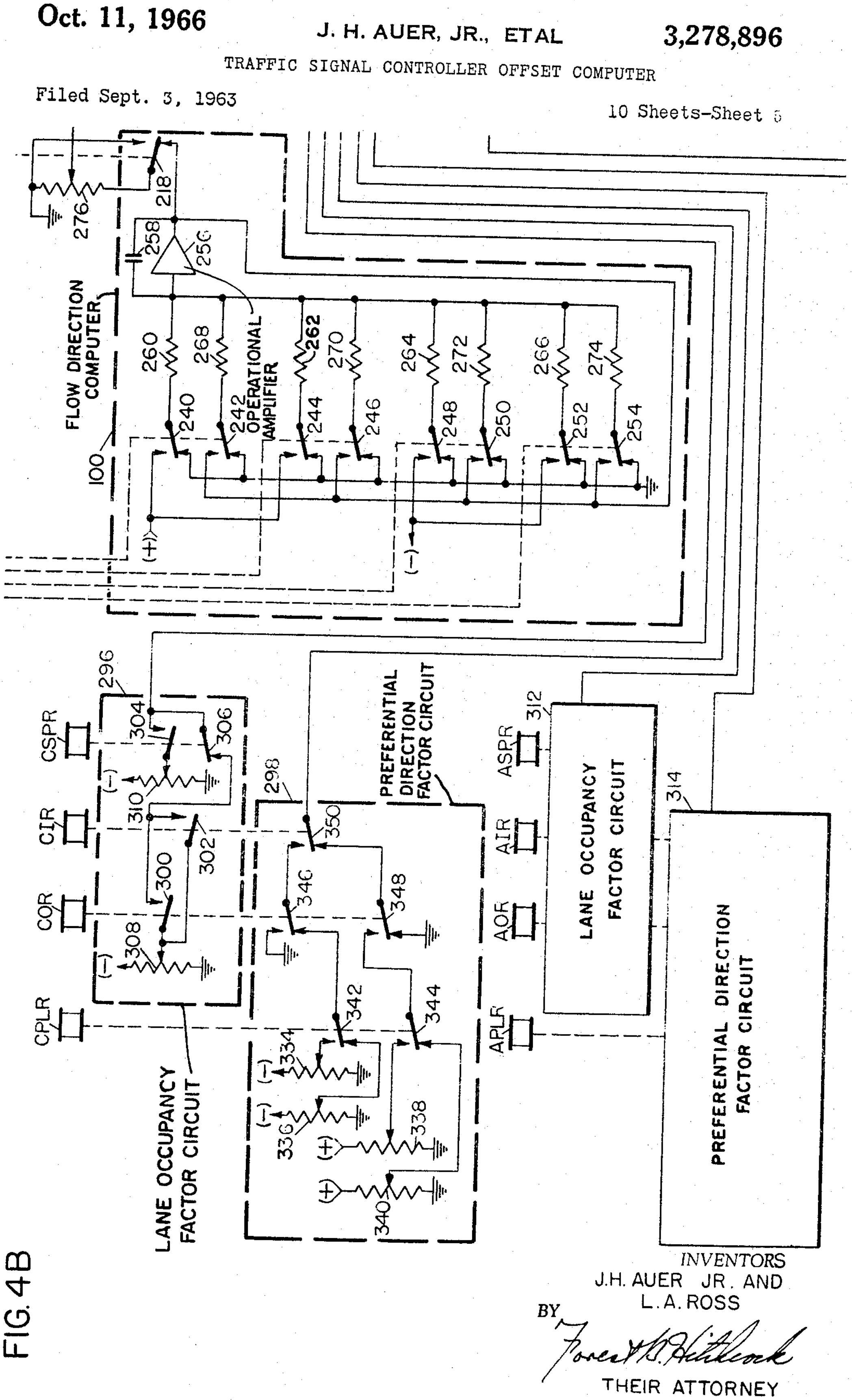

Output voltage from computer 114 is coupled to averaging circuit 116 through a summing resistor 290. Input voltage analogs of lane occupancy in section C are provided to the averaging circuit from the offset computer of section C through a summing resistor 292, while input voltage analogs of lane occupancy in section A are coupled to averaging circuit 116 through a summing resistor 294. Output relays CPL, CO, CI and CSP not shown in the offset computer for section C and output relays APL, AO, AI and ASP not shown in the offset computer for section A drive respective repeater relays CPLR, COR, CIR, CSPR, APLR, AOR, AIr and ASPR situated in the section B offset computer as shown in FIG. 4B. The functions of relays CPL, CO, CI and CSP respectively and relays APL, AO, AI and ASP, respectively, are identical to those of relays BPL, BO, BI and BSP. A lane occupancy factor circuit 296 and a preferential direction factor circuit 298, both of which exist in the section B offset computer, are also shown in FIG. 4B. Lane occupancy factor circuit 296 comprises a front contact 300 of relay COR, a front contact 302 of relay CIR and a front contact 304 and back contact 306 of relay CSPR. The heels of contacts 300 and 302 are coupled to a predetermined value of negative voltage selected through a potentiometer 308. The heel of contact 304 is similarly coupled to a source of negative voltage through a potentiometer 310. Front contacts 300 and 302 are parallel-coupled to back contact 306. Front contact 304 and the heel of contact 306 are parallel-coupled to the input side of summing resistor 292.

Output signals from lane occupancy factor circuit 296 are coupled to averaging circuit 116 in the following manner. Assuming heavy lane occupancy in either direction in section C, front contact 304 is closed, coupling a large negative voltage to averaging circuit 116 from potentiometer 310. On the other hand, assuming relay COR is energized, as is the case when outbound lane occupancy in section C is moderate or expected to become moderate, or assuming relay CIR is energized, as is the case when inbound lane occupancy in section C is moderate or expected to become moderate, or assuming both relays COR and CIR are energized, as is the case when both outbound and inbound lane occupancies in section C are moderate, a negative voltage of lesser amplitude than that provided from potentiometer 310 is provided through either front contact 300 or front contact 302, or both as the case may be, and back contact 306, to averaging circuit 116 through resistor 292. In identical fashion, lane occupancy information for section A is provided from a lane occupancy factor circuit 312 in the section A offset computer, controlled by contacts of relays AOR, AIR and ASPR. It should be noted that in the event traffic is light in either section C or A, no lane occupancy signal for that section is coupled to averaging circuit 116.

Averaging circuit 116 receives a single voltage substantially equal to the sum of voltages applied to resistors 290, 292 and 294. This voltage is averaged over a predetermined time interval, and the averaged signal is applied to occupancy level monitor circuit 124. This circuit classifies the signal applied thereto by controlling a pair of switch contacts 316 and 318. These contacts control application of energy to occupancy-direction encoder 120 and the output relays of the section B offset computer in a manner described infra.

Output from flow direction computer 100 is coupled to the input of averaging circuit 104 through a summing resistor 320. In addition, a preferential direction factor signal from the section C offset computer is coupled to averaging circuit 104 through a summing resistor 322, while a preferential factor signal for section A is coupled to averaging circuit 104 from the section A offset computer through a summing resistor 324. The preferential direction signals from the sections C and A offset computers are produced in preferential direction factor circuits 298 and 314, respectively located at the section B offset computer. Preferential direction factor circuit 298 is controlled by relays CPLR, COR and CIR in a fashion detailed below, while preferential direction factor circuit 314 is controlled by relays APLR, AOR and AIR, in a similar manner.

A group of potentiometers 334, 336, 338 and 340 are provided. Potentiometers 334 and 336 provide variable negative voltages, while potentiometers 338 and 340 provide variable positive voltages. Relay CPLR has associated therewith a pair of contacts 342 and 344. Back contact 342 receives negative voltage from potentiometer 336, while back contact 344 receives positive voltage from potentiometer 340. Similarly, front contact 342 receives negative voltage from potentiometer 334, while front contact 334 receives positive voltage from potentiometer 338. A pair of contacts 346 and 348 are associated with relay COR. Back contact 346 is coupled to the heel of contact 342, while front contact 348 is coupled to the heel of contact 344. Similarly, front contact 346 and back contact 348 are grounded. The heel of contact 346 is coupled to a front contact 350 of relay CIR, while the heel of contact 348 is coupled to back contact 350.

Preferential direction factor circuit 298 operates in the following manner. When only relay CPLR is energized, zero volts are applied to summing resistor 322 through back contacts 348 and 350. In the event relay CPLR is energized along with relay COR, an outbound preferential direction is expected in section C. Under these circumstances, a positive potential is applied to resistor 322 from potentiometer 338 through a series circuit comprising front contacts 344 and 348 and back contact 350. In the event relays CPLR and CIR are energized, indicating that an inbound preferential direction is expected in section C, a negative potential is applied to resistor 322 from potentiometer 334 through a series circuit comprising front contact 342, back contact 346 and front contact 350. In the event section C lane occupancy is moderate in both inbound and outbound directions, relays COR and CIR are both energized, coupling zero potential to resistor 322 through front contacts 346 and 350 in series. When outbound lane occupancy in section C is moderate, relay COR is energized, coupling positive potential to resistor 322 from potentiometer 340 through a series circuit comprising, back contact 344, front contact 348 and back contact 350. Similarly, if inbound lane occupancy in section C is moderate, relay CIR is energized and resistor 322 receives negative potential from potentiometer 336 through a series circuit comprising back contact 342, back contact 346 and front contact 350. In similar fashion, preferential direction factor circuit 314 provides a voltage to resistor 324 indicative of preferential traffic direction in section A as determined by relays APLR, AOR and AIR controlled from the section A offset computer.

Figure 4C:
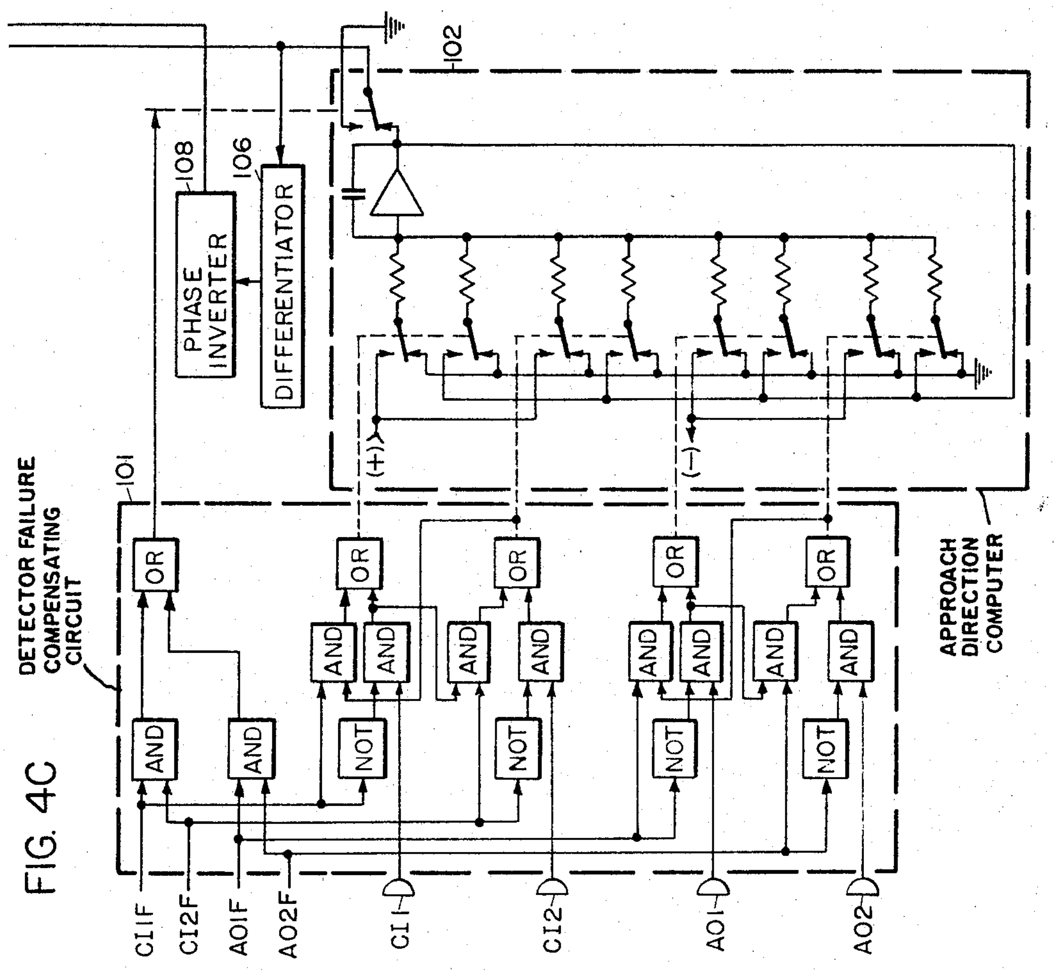

FIG. 4C schematically illustrates the logic circuitry involved in detector failure compensating circuit 101, and the circuitry associated with approach direction computer 102. It will be noted that the circuitry of detector failure compensating circuit 101 is identical to the circuitry of detector failure compensating circuit 110, and the circuitry of approach direction computer 102 is identical to the circuitry of flow direction computer 100. However, inputs from the inbound detectors to detector failure compensating circuit 101 are provided from the inbound detectors in section C, while inputs from the outbound detectors to the detector failure compensating circuit 101 are provided from the outbound detectors in section A. Similarly, the detector failure leads coupled to detector failure compensating circuit 101 are responsive to failure of detectors CI1, CI2, AO1 and AO2, respectively. Hence, output from approach direction computer 102 represents average inbound lane occupancy in section C minus average outbound lane occupancy in section A divided by average inbound lane occupancy in section C plus average outbound lane occupancy in section A. This parameter is somewhat similar to the parameter provided by flow direction computer 100. However, the traffic now taken into account is in the arterial sections adjacent to section B, rather than in section B itself. Hence, this parameter represents flow direction of traffic approaching section B from either direction. When combined with the output from flow direction, computer 100, the composite signal represents flow direction over an entire three section length, with overlapping flow in the middle section. Hence, output from computer 102 is coupled to averaging circuit 104 through a summing resistor 326 in series with a potentiometer 330 which permits a limited amount of variation of the summing resistance between the output of computer 102 and the input of averaging circuit 104. This provides the user with a weighting factor, enabling him to control the effect of output voltage from computer 102 on averaging circuit 104, within limits.

Output from differentiator 106 is coupled through phase inverter 108 and applied to averaging circuit 104 through a summing resistor 328 in series with a potentiometer 332. This circuit provides information as to the rate of change of output from approach direction computer 102, thereby providing an anticipation factor to averaging circuit 104. This is obtained by differentiating the output voltage of computer 102 in differentiator 106. Potentiometer 332 then permits weighting of the anticipation factor, within limits. Phase inverter 108 ensures that output voltage of differentiator 106 is applied to averaging circuit 104 with proper polarity.

The input voltages applied to summing resistors 320, 322, 324, 326 and 328 are algebraically summed in the summing resistor network, and the composite resulting voltage is applied to averaging circuit 104. This circuit averages the composite applied voltage over a predetermined time interval. The averaged signal is then coupled to direction level monitor 118, which classifies the applied signal in accordance with amplitude. Associated with this level monitor are switch contacts 350, 352, 354 and 356. These contacts comprise occupancy-direction encoder 120, illustrated schematically in FIG. 4D.

A timing relay OT, having contacts 368, 370, 372, 374 and front contacts 376 and 378 is provided. Front contacts 376 and 378 comprise internal portions of delay circuit 126, while contacts 368, 370, 372 and 374 comprise contacts controlled thereby. Output relays BI, BPL, BO and BSP are also provided. Each of these relays is resistively shunted, in order to provide slow dropaway. Relay BI receives energy from the heel of contact 368, relay BPL from the heel of contact 370, relay BO from the heel of contact 372, and relay BSP from the heel of contact 374.

Back contact 374 is directly coupled to front contact 318 of level monitor 124. Back contact 372 is directly coupled to back contact 356 in encoder 120. Back contact 368 is directly coupled to front contact 354 and the heel of contact 352 in encoder 120. Back contact 370 is coupled to back contact 316 of occupancy level monitor 124 through a forward-connected diode 358, to back contact 350 of encoder 120 through a forward-connected diode 360, and to back contact 354 of encoder 120 through a forward-connected diode 362. Back contact 372 is coupled to back contact 352 of encoder 120 through a forward-connected diode 364, and to back contact 354 through a forward-connected diode 366. Within encoder 120, front contact 356 is coupled to the heel of contact 354. Similarly, front contact 352 is coupled to the heel of contact 350.

For the purpose of determining circuit paths from direction level monitor 118 and occupancy level monitor 124 to relays BI, BO, BL and BSP, assume for the moment that relay OT is deenergized. Hence, when lane occupancy is light, back contact 316 of level monitor 124 provides energization for relay BPL. Under heavy lane occupancy conditions, both front contacts 316 and 318 are closed, permitting energization of relay BSP and the heel of contact 356. In the event traffic lane occupancy is at a moderate, or medium level, front contact 316 is closed, permitting energization of the heel of contact 356.

When output from occupancy level monitor 124 is at a moderate, or medium, level, and if back contact 356 is closed, relay BO is energized, indicating moderate lane occupancy in the outbound direction. In the event front contact 356 is closed and back contact 354 is closed, relay BO is energized through diode 366 and relay BPL is energized through diode 362. This provides an indication that outbound lane occupancy is expected to become moderate momentarily. In the event front contacts 356 and 354 are closed, and back contact 352 is closed, relay BI is energized and relay BO is energized through diode 364. This provides an indication that lane occupancy is moderate in both the inbound and outbound directions. In the event front contacts 356, 354 and 352 are closed, and back contact 350 is closed, relay BI is energized and relay BPL is energized through diode 360. This provides an indication that lane occupancy in the inbound direction is momentarily expected to become moderate. Finally, with front contacts 356, 354 and 352 closed, and back contact 350 open, relay BI is energized, indicating that traffic in the inbound direction is moderate.

In similar fashion, when output from occupancy level monitor 124 is at a heavy level, front contacts 316 and 318 are closed, energizing relay BSP. Then, if back contact 356 is closed, relay BO is energized, indicating heavy lane occupancy in the outbound direction. In the event front contact 356 is closed and back contact 354 is closed, relay BO is energized through diode 366 and relay BPL is energized through diode 362, relay BSP remaining energized. This provides an indication that outbound lane occupancy is expected to become heavy momentarily. In the event front contacts 356 and 354 are closed, and back contact 352 is closed, relay BI is energized and relay BO is energized through diode 364, relay BSP remaining energized. This provides an indication that lane occupancy is heavy in both the inbound and outbound directions. In the event front contacts 356, 353, and 352 are closed, and back contact 350 is closed, relay BI is energized and relay BPL is energized through diode 360, relay BSP still remaining energized. This provides an indication that lane occupancy in the inbound direction is momentarily expected to become heavy. Finally, with front contacts 356, 354 and 352 closed, and back contact 350 open, relay BI is energized, while relay BSP also remains energized, indicating that traffic in the inbound direction is heavy.

From the foregoing discussion, it is obvious that as input voltage to direction level monitor 118 increases from a large negative amplitude to a large positive amplitude, back contacts open and front contacts close with the change in amplitude of applied voltage in the following order: 356, 354, 352 and 350. Similarly, front contacts close and back contacts open in occupancy level monitor 124 with changing amplitude of applied voltage in the positive direction in the following order: 316, 318. It should also be noted that when relay BPL is energized along with either relay BI or BO, lane occupancy in section B is moderate in both directions, but expected to become greater in either the inbound or outbound direction, depending upon whether relay BI or BO is energized, than in the opposite direction, by a predetermined amount. Similarly, when relays BSP and BPL are energized along with either relay BI or BO, lane occupancy in section B is heavy in both directions, but expected to become heavier in either the inbound or outbound direction, depending upon whether relay BI or BO is energized, than in the opposite direction, by a predetermined amount. Diodes 358, 360, 362, 364, and 366 serve to prevent undesired "sneak" circuits, which would otherwise furnish energization paths for relays not intended to be energized.

Time delay circuit 126 comprises an operational amplifier 380 having a feedback capacitor 382 shunted across its input and output terminals. Positive input voltage is coupled to amplifier 380 from a voltage divider comprising a resistor 384 connected in series with a variable resistance 386 between the positive voltage supply and ground, through a variable resistance 388. A relay OTP receives energy from front contact 378 of relay OT. A back contact 390 of relay OTP is coupled in series with a resistor 392. The series combination of contact 390 and resistor 392 is shunted across the input and output of amplifier 380 in parallel with capacitor 382. Hence it can be seen that when relay OTP is energized, the circuit comprising resistance 388, amplifier 380 and capacitor 382 comprises an integrator circuit. Closing back contact 390 permits any charge stored on capacitor 382 to leak off through resistor 392.

Output of amplifier 380 furnishes a first input voltage to an analog comparator circuit 394. The voltage applied thereto is of negative polarity, due to the phase inversion of amplifier 380. A second input voltage to analog comparator 394 is furnished from a potentiometer 396. This voltage is of positive polarity, since the potentiometer is connected between the positive voltage source and ground. Analog comparator 394 algebraically sums the input voltages applied thereto, and when the polarity of the algebraic sum changes, output voltage from the analog comparator changes from a large amplitude voltage of one polarity to a large amplitude voltage of the opposite polarity. Output voltage from the analog comparator is coupled through an amplifier 398 and applied to front contact 376 of relay OT.

Contacts 400, 420, 404 and 406 are associated respectively with output relays BSP, BO, BPL and BI. The heel of each of these contacts is separately coupled through a forward-connected diode to the coil of relay OT. The front and back contact of each of these contacts is energized from a point common to a separate series-connected resistor-capacitor circuit coupled across the positive and negative terminals of the voltage source whereby resistor is coupled to the positive side and each capacitor is coupled to the negative side. For example, back contact 400 is energized from point common to a resistor 408, one side of which is coupled to the positive side of the voltage source, and a capacitor 410, one side of which is coupled to the negative side of the voltage source. Front contact 400 is similarly energized from a resistor 412 and capacitor 414.

With relay BSP in the deenergized condition, capacitor 410 is shunted by the coil of relay OT, so that the capacitor is substantially discharged through the low coil resistance. If now relay BSP should become energized, front contact 400 closes, discharging capacitor 414, which at this time is substantially fully charged, through relay OT, energizing the relay. Simultaneously, with back contact 400 open, capacitor 410 begins to acquire a charge. The rate at which capacitor 410 acquires a charge is dependent upon the RC time constant of the circuit comprising resistor 408 and capacitor 410.

Energization of relay OT closes front contacts 376 and 378, coupling output from amplifier 398 to relay OT and removing the shunt comprising resistor 392 from across the input and output terminals of operational amplifier 380, respectively. At this juncture, amplifier 398 is in heavy conduction, providing positive energization voltage for relay OT which maintains the relay energized. However, amplifier 380, functioning as an integrating circuit because of input resistance 388 and feedback capacitor 382, begins to charge capacitor 382. As the voltage amplitude of this charge increases, it reaches and slightly exceeds the voltage magnitude applied to comparator 394 from voltage divider 396. At this time, output voltage from analog comparator 394 abruptly reverses polarity, so that a large positive voltage is now produced therefrom. This causes amplifier 398 to switch into cutoff, deenergizing relay OT, opening front contact 378, thereby reapplying shunt resistor 392 across operational amplifier 380. This feedback resistor then holds the charge stored on capacitor 382 to a low value, which is of insufficient amplitude to switch output voltage from comparator 394 back to a positive value. Hence, the timing circuit comprising operational amplifier 380, analog comparator 394 and amplifier 398 requires energization of relay OT for initiation of the time delay. The time delay may be varied by adjustment of resistances 386 and 388. Diodes 416, 418, 420 and 422 coupled to the heels of contacts 400, 402, 404 and 406 respectively, prevent undesired current from passing through the contacts through which they are coupled. For example, assume relay BO is energized. Closing of front contact 402 discharges a charged capacitor 424 coupled thereto through diode 418. It is desirable that the current produced by this capacitor discharge be used to energize relay OT. However, some of this current would also tend to charge the capacitor coupled to the closed contact of each offset computer output relay in time delay circuit 126. For example, assuming back contact 400 of relay BSP is closed, some of this current would tend to charge capacitor 410. However, due to presence of diode 416, this cannot occur.

When relay OT is deenergized, output relay BI, BPL, BO and BSP are capable of energization through back contacts 368, 370, 372 and 374 of relay OT. However, during the interval in which relay OT is energized, back contacts 368, 370, 372 and 374 are opened, preventing energization of the aforementioned output relays. Each of the aforementioned output relays has associated therewith a front contact. Hence, front contacts 428, 430, 432 and 434 are associated respectively with relays BSP, BO, BPL and BI. These contacts are each coupled to the source of positive voltage, and to front contacts 374, 372, 370 and 368 respectively. When any output relay is energized either from encoder 120 or directly from level monitor 124, such as relay BI for example, the front contact associated therewith, here contact 434, closes. In addition, relay OT is energized by capacitor discharge through front contact 406. This closes front contact 368 of relay OT, providing a stick circuit for relay BI through series front contacts 434 and 368.

When relay OT is subsequently deenergized, front contact 368 opens and back contact 368 closes. The purpose of resistively shunting the output relays is now obvious, since in the event that continued energization of relay BI is called for from encoder 120 after relay OT is deenergized, relay BI will remain energized during the time between opening of front contact 368 and closing of back contact 368, thereby continuing its output indication to the traffic signal controllers and to the sections A and C offset computers, without again energizing relay OT by closing back contact 406.

Once this initial time delay provided by delay circuit 126 has elapsed, in the event the previously energized offset output relays remain energized, a change of offset can now be accomplished immediately upon actuation of any of the switch contacts controlled by either level monitor. This feature ensures against too frequent changes in offset which conceivably could upset smooth traffic flow if permitted to change each time a momentary change in traffic conditions is sensed, while enabling rapid offset changes after the delay provided by time delay circuit 126 has elapsed.

Front contacts 436 and 438 of relays BO and BI respectively are used for providing preferential offset signals to preferential direction switching circuit 112 through leads BOP and BIP respectively. In addition, lane occupancy factor circuits for section B at the offset computers for sections A and C and preferential direction factor circuits for section B at the offset computers for sections A and C of configurations similar to that described for lane occupancy factor circuit 296 and preferential direction factor circuit 298 respectively, are energized from a group of front contacts 440, 442, 444 and 446 of relays BI, BPL, BO and BSP, respectively. The factors provided thereby are utilized by the sections A and C offset computers in a manner similar to that by which such factors provided from the sections A and C offset computers are utilized by the section B offset computer. The offset signals produced from the section B offset computer are coupled to the section B traffic signal controllers through front contacts 448, 450, 452, and 454 of relays BI, BPL, BO and BSP, respectively.

*Detailed circuitry of FIGURE 5 corresponding to logic circuitry of FIGURE 4A*

Turning next to FIG. 5 there is shown means for implementing the logic circuitry of FIG. 4A with relays. This circuitry is shown for the purpose of example only, since it is obvious that logic circuitry can be implemented by semiconductor circuits, vacuum tube circuits, magnetic circuits, etc., as well as relay circuits. Detector failure compensating circuit 110 comprises relays IB1F, IB2F, OB1F and OB2F. These relays represent detector failure relays which may be operated by time-dependent signals from detectors BI1, BI2, BO1 and BO2 are produced by detector-dependent contacts 500, 502, 504 and 506, respectively. In addition, preferential direction switching circuit 112 comprises a pair of preferential direction responsive relays BOIP energized through lead BIP and BOOP energized through lead BOP. A third relay LAV in preferential direction switching circuit 112 is responsive to the condition of relays BOIP and BOOP, so that it is energized when either both relays BOIP and BOOP are deenergized or both are energized. Lane occupancy computer 114 comprises relays LO1, LO2, LO3 and LO4, each relay controlling input voltage to amplifier 210 through its respective contact 194, 196, 198 and 200.

Contacts 508, 510, 512 and 514 of relay LAV are respectively coupled to relays LO1, LO2, LO3 and LO4. When relay LAV is in its energized condition; that is, when no preferential offset at the output of the section B offset computer exists, relays LO1, LO2, LO3 and LO4 are respectively energized by detector contacts 500, 502, 504 and 506. On the other hand, when a preferential offset at the output of the section B offset computer is present, either relay BOIP or BOOP is energized. Contacts 516, 518 520 are associated with relay BOOP, while contacts 522, 524 and 526 are associated with relay BOIP.

Assuming relay BOOP is energized in response to an outbound preferential offset in section B, front contact 520 and back contact 526 are closed, deenergizing relay LAV. Moreover, front contacts 516 and 518 are closed, while back contacts 522 and 524 are closed. Assuming detector failure relays IB1F, IB2F, OB1F and OB2F are all deenergized, signals from detectors BI1 and BI2 can no longer reach relays LO1 and LO2. However, signals from detector BO1 can energize relay LO3 through a path comprising back contacts 522 and 512, while signals from detector BO2 can energize relay LO4 through a path comprising back contacts 524 and 514. Furthermore, relay LO1 is energized from detector BO1 instead of BI1 through a circuit comprising back contact 522, front contact 516 and back contact 508. Similarly, relay LO2 is energized from detector BO2 through a series circuit comprising back contact 524, front contact 518 and back contact 510. Hence, in the event of a preferential offset in the outbound direction, signals from detector BO1 energize relays LO1 and LO3, while signals from detector BO2 energize relays LO2 and LO4.

In the event of an inbound preferential offset, relay BOIP is energized and relay BOOP is deenergized. Again, relay LAV is deenergized, and detectors BO1 and BO2 can no longer provide inputs to lane occupancy computer 114. Instead, signals from detector BI1 energize relay LO1 through a series circuit comprising back contacts 516 and 508, and relay LO3 through a series circuit comprising back contact 516, front contact 522 and back contact 512. Similarly, signals from detector BI2 operate relay LO2 through a series circuit comprising back contact 518 and back contact 510, and operate relay LO4 through a series circuit comprising back contact 518, front contact 524 and back contact 514. Hence, it is obvious that in the event of a preferential offset, only the detectors sensing traffic in the preferential direction can operate lane occupancy computer 114. Moreover, because each detector operates a pair of relays in computer 114 in the event of a preferential offset, rather than a single relay, signals from the detectors sensing traffic in the preferential direction are doubly weighted in the computer.

In the event no detectors have failed, back contacts 528 of relay IB1F, 530 of relay IB2F, 532 of relay OB1F and 534 of relay OB2F are closed. Under these conditions, detector BI1 operates a relay FD1 of flow direction computer 100 in parallel with relay LO1, detector BI2 operates a relay FD2 in the flow direction computer in parallel with relay LO2, detector BO1 operates a relay FD3 in the flow direction computer in parallel with relay LO3 and detector BO2 operates a relay FD4 in the flow direction computer in parallel with relay LO4. Contacts 240 and 242 are operated by relay FD1, contacts 244 and 246 are operated by relay FD2, contacts 248 and 250 are operated by relay FD3 and contacts 252 and 254 are operated by relay FD4. The functions of the contact operated by the FD relays has already been described in connection with the description of operation of flow direction computer 100 in FIG. 4B.

In the event of a detector failure, the detector failure relay associated with the failed detector is energized, in a manner previously described. This relay then functions to couple the remaining operative detector sensing traffic moving in the same direction as that normally sensed by the failed detector to the circuits normally receiving energy from the detector now inoperative.

For example, assume detector BI1 has failed. Failure relay IB1F is thereby energized, opening back contact 528 which removes detector BI1 from the system. Front contact 528 closes, however, thereby permitting energy from detector BI2 to reach computers 100 and 114 through a path comprising back contact 530 in series with front contact 528. In addition, signals from detector BI2 reach computers 100 and 114 from back contact 530 without being passed through front contact 528. Hence, signals from detector BI2 are doubly weighted in computers 100 and 114. This is obviously the case, since relays FD1 and FD2 are both energized from detector BI2, and, assuming no preferential offset exists in section B, relays LO1 and LO2 are also energized by output from detector BI2.

In the event detector BI2 fails, back contact 530 opens, removing detector BI2 from the system. However, front contact 530 closes. This permits signals from detector BI1 to reach computers 100 and 114 in place of signals from detector BI2, by passing through a series circuit comprising back contact 528 and front contact 530. Signals from detector BI1 are also coupled to computers 100 and 114 through back contact 528 in normal fashion for detector BI1. Hence, in the event detector BI2 fails, output signals from detector BI1 are doubly weighted in computers 100 and 114. In like fashion, failure of detector BO1 opens back contact 532 and closes front contact 532, permitting signals from detector BO2 to reach computers 100 and 114 in place of detector BO1, and be doubly weighted therein. Similarly, failure of detector BO2 opens back contact 534 and closes front contact 534, permitting signals from detector BO1 to be substituted for signals from detector BO2 in computers 100 and 114, and be doubly weighted therein.

In the event both relays detecting traffic passing in one direction should fail, back contact 216 in computer 114 and back contact 218 in computer 100 are opened removing computed values of lane occupancy and preferential direction in section B from the section B offset computer. Instead, front contacts 216 and 218 are closed, providing predetermined constant voltages to the system, in a manner previously described. Contacts 216 and 218 are driven from a relay BF, which in turn is energized either through a series circuit comprising a front contact 536 of relay IB1F and a front contact 538 of relay IB2F, or a series circuit comprising a front contact 540 of relay OB1F and a front contact 542 of relay OB2F. This avoids production of a totally inactive offset signal from the section B offset computer in the event all detectors sensing a given direction of traffic should fail.

FIG. 6 is an illustration of relay logic for detector failure compensating circuit 101 and approach direction computer 102, shown in FIG. 4C. The circuitry of computer 102 is identical to the circuitry of computer 100 as shown in FIG. 5, with relays AD1, AD2, AD3 and AD4 in computer 102 corresponding in operation to relays FD1, FD2, FD3 and FD4 respectively, in computer 100. Hence, under normal operating conditions, detectors CI1, CI2, AO1 and AO2 are operative, and provide output signals which repectively energize relays AD1, AD2, AD3 and AD4. Failure of detector CI1, however, causes energization of relay IC1F, which requires output signals from detector CI2 to energize both relays AD1 and AD2, in a manner similar to that described in FIG. 5. Similarly, failure of detector CI2 causes energization of detector failure relay IC2F, which then provides for energization of relays AD1 and AD2 from detectors CI1 only. Similarly, in the event of failure of detector AO1, relay OA1F is energized, and output from detector AO2 energizes relays AD3 and AD4, while in the event of failure of detector AO2, relay OA2F is energized, providing for energization of relays AD3 and AD4 from detector AO1. In the event both detectors CI1 and CI2 or both detectors AO1 and AO2 fail, either relays IC1F and IC2F are energized, or relays OA1F and OA2F are energized. Energization of both detector failure relays for traffic in either direction causes energization of a relay CAF, which opens its back contact 602 and closes its front contact 602. This removes computed output signals produced by computer 102 from the section B offset computer system, and provides instead a ground, or zero signal. This prevents a gross inaccuracy from appearing in the output of the section B offset computer which would otherwise be the case if an erroneous voltage unrelated to traffic conditions in arterial sections A and C were permitted to be produced from computer 102.

Thus there has been shown a real time computer for supplying offset signals to traffic controllers along a highway in accordance with demands of traffic. The system computes proper offsets for a plurality of traffic signal controllers located along a section of a vehicular route based upon demands of traffic within the section and traffic within adjacent sections. The system is responsive to inbound and outbound traffic lane occupancies and anticipated lane occupancies. In addition, the system provides means for substituting inputs to the offset computer from an operative vehicle detector for those of a detector normally sensing traffic in the same direction but which has failed. The offset computer is provided with means for computing lane occupancy in both directions when traffic is substantially equal in both directions and computes lane occupancy in only a preferential direction when lane occupancy in the preferential direction substantially exceeds lane occupancy in the opposite direction. The system is rugged and reliable, requires but a modest amount of power, and is readily adaptable to a traffic artery of any length, having any number of intersections with secondary streets, and handling widely fluctuating traffic loads. Moreover, although the system has been described for but a single inbound and single outbound lane, those skilled in the art will readily recognize that an offset computer comprising the present invention may be easily adapted to use with a multi-lane artery by providing detectors for each lane and coupling outputs from the detectors for each lane to the computer in parallel, so that the computer operates on information pertaining to total lane occupancy in the inbound direction and total occupancy in the outbound direction.

Although but several embodiments of the present invention have been described, it is to be specifically understood that these forms are selected to facilitate in disclosure of the invention rather than to limit the number of forms which it may assume; various modifications and adaptations may be applied to the specific forms shown to meet requirements of practice, without in any manner departing from the spirit or scope of the invention.

What is claimed is:

1. An offset computer for providing offset information to a plurality of traffic signal controllers located along one section of a highway divided into a plurality of sections, each section adjacent said one section containing a plurality of traffic signal controllers operated from a separate offset computer, comprising inbound and outbound lane occupancy comparison means responsive to traffic conditions within said one section for providing preferential direction information, absolute lane occupancy measurement means responsive to traffic conditions within said one section for providing lane occupancy information, means coupling lane occupancy information to traffic signal controllers in the adjacent sections, and means responsive to the measured lane occupancy within said one section, the received lane occupancy from the computers associated with the adjacent sections and the determined preferential direction for providing a combination of separate voltages in accordance therewith.

2. The offset computer of claim 1 wherein said last-named means includes delay means for inhibiting changes in said combination of offset voltages until a predetermined time interval has elapsed subsequent to the most recent change in said combination.

3. An offset computer for providing offset information to a plurality of traffic signal controllers located along one section of a highway divided into a plurality of sections, each section adjacent said one section containing a plurality of traffic signal controllers operated from a separate offset computer, comprising inbound and outbound lane occupancy comparison means responsive to traffic conditions within said one section for providing preferential direction information, absolute lane occupancy measurement means responsive to traffic conditions within said one section for providing lane occupancy information, means coupling preferential direction information for the adjacent sections from the computers providing information to traffic signal controllers in the adjacent sections and means responsive to the measured lane occupancy within said one section, the determined preferential direction within said one section, and the received preferential direction information from the computers associated with the adjacent sections for providing offset voltages to the controllers of said one section in accordance therewith.

4. An offset computer for providing offset information to a plurality of traffic signal controllers located along one section of a highway divided into a plurality of sections, each section adjacent said one section containing a plurality of traffic signal controllers operated from a separate offset computer, comprising inbound and outbound lane occupancy comparison means responsive to traffic conditions within said one section for providing preferential direction information, absolute lane occupancy measurement means responsive to traffic conditions within said one section for providing lane occupancy information, means coupling lane occupancy information and preferential direction information for the adjacent sections from the computers providing information to traffic signal controllers in the adjacent sections, and means responsive to the measured lane occupancy and determined preferential direction within said one section and the received lane occupancy information and the received preferetial direction from the computers associated with the adjacent sections for providing offset voltages to the controllers of said one section in accordance therewith.

5. An offset computer for providing offset information to a plurality of traffic signal controllers located along one section of a highway divided into a plurality of sections, each section adjacent said one section containing a plurality of traffic signal controllers operated from a separate offset computer, comprising inbound and outbound lane occupancy comparison means responsive to traffic conditions within said one section for providing preferential direction information, additional inbound and outbound lane occupancy comparison means responsive to adjacent section traffic flow toward said one section for providing preferential direction information, absolute lane occupancy measurement means responsive to traffic conditions within said one section for providing lane occupancy information, means receiving adjacent section lane occupancy and preferential direction information from the computers operating traffic signal controllers in the adjacent sections, and means responsive to the measured lane occupancy and determined preferential direction within said one section, the determined preferential direction of adjacent section traffic flow toward said one section, and the received lane occupancy preferential direction from the computers associated with the adjacent sections for providing offset voltages to the controllers of said one section in accordance therewith.

6. An offset computer for providing offset information to a plurality of traffic signal controllers located along one section of a highway divided into a plurality of sections, each section adjacent said one section containing a plurality of traffic signal controllers operated from a separate offset computer, comprising inbound and outbound lane occupancy comparison means responsive to traffic conditions within said one section for providing preferential direction information, additional inbound and outbound lane occupancy comparison means responsive to adjacent section traffic flow toward said one section for providing additional preferential direction information, means differentiating said additional preferential direction information with respect to time for providing information as to rate of change thereof, absolute lane occupancy measurement means responsive to traffic conditions within said one section for providing lane occupancy information, means receiving adjacent section lane occupancy and preferential direction information from the computers operating traffic signal controllers in the adjacent sections, and means responsive to the measured lane occupancy and determined preferential direction within said one section, the determined preferential direction of adjacent section traffic flow approaching said one section, the rate of change of the determined preferential direction of adjacent section traffic flow approaching said one section, and the received lane occupancy preferential direction from the computers associated with the adjacent sections for providing offset voltages to the controllers of said one section in accordance therewith.

7. In a traffic signal offset computer including means for producing a signal characteristic of a traffic parameter from signals supplied by a plurality of vehicle detectors, circuit means coupling the detectors to said voltage analog producing means comprising, first failure detector means coupled to a first vehicle detector and operative to a distinctive condition only when said first vehicle detector is responsive to passing vehicles, switching means responsive to said first failure detector means for coupling the output from said first detector to a first input of said voltage analog producing means only while the first detector is operative, second failure detector means coupled to a second vehicle detector and operative to a distinctive condition only when said second vehicle detector is responsive to passing vehicles, switching means responsive to said second failure detector means for coupling the output from the second detector to a second input of said voltage analog producing means while the second detector is operative, and circuit means coupling the output from the first detector also to the second input of said voltage analog producing means while the first detector is operative and the second detector inoperative.

8. The circuit means of claim 7 including additional circuit means coupling the output from the second detector also to the first input of said voltage analog producing means when the second detector is operative and the first detector inoperative.

9. A traffic signal control system for a highway artery divided into a plurality of successive sections each including a plurality of intersections at which traffic signals control the signal indications displayed both to artery and cross street traffic, an offset selecting means for a particular section for selecting a preferential direction of offset for artery traffic for said section and also the amount of offset of the successive signals in that section to thereby facilitate non-stop artery traffic in the preferred direction comprising, at least one vehicle detector in said particular section for each direction of traffic and at least one vehicle detector for each adjacent section responsive to vehicles traveling in such adjacent section and in a direction toward said particular section, first traffic differential responsive circuit means controlled by said vehicle detectors in said particular section for generating a first signal characteristic of the difference in traffic flow in the opposite directions respectively, second traffic differential responsive circuit means controlled by said vehicle detectors in the adjacent section for generating a second signal characteristic of the difference in the traffic flow toward said particular section in the respective adjacent sections, and means controlled at least in part by said first and second signals for producing an output signal representative of the preferential direction and amount of offset for the traffic signals of said particular direction.

10. The apparatus of claim 9 which further includes means for generating a third signal representative of the rate of change of said second signal, said means for producing said output signal being responsive also to said third signal.

11. Apparatus for selecting a desired one of a plurality of offsets for a particular section of a progressive signal system comprising a plurality of sections each including a multiplicity of traffic signals controlling the display of signal indications at respective intersections of cross streets with an artery comprising in combination, vehicle detector means for said particular section for measuring separately both inbound and outbound traffic in said particular section, first traffic differential responsive circuit means controlled by said vehicle detector means for generating a first signal characteristic of the difference in inbound and outbound traffic levels in said particular section, vehicle detector means for an adjacent section lying to one side of said particualr section and responsive to vehicles in said one section which are proceeding inbound toward said particular section, vehicle detector means for an adjacent section lying to the other side of said particular section and responsive to vehicles in said other section which are proceeding outbound toward said particular section, second traffic differential means responsive circuit means controlled by said vehicle detector means for both said adjacent sections for generating a second signal characteristic of the difference in traffic levels measured thereby, and means responsive to both said first and second signals for selecting the desired offset.

12. The apparatus as defined in claim 11 which further includes means responsive to said vehicle detector means for said particular section for generating a third signal characteristic of the average of the inbound and outbound traffic levels in said particular section, said selector means being responsive also to said third signal for selecting said desired offset.

13. The apparatus of claim 12 which further includes means responsive to said vehicle detectors in both said adjacent sections for generating a fourth signal characteristic of the average of the traffic levels measured respectively thereby, said output means being controlled also in response to said fourth signal for selecting the desired offset.

(References on following page)

References Cited by the Examiner

UNITED STATES PATENTS

| | | | |
|---|---|---|---|
| 3,120,651 | 2/1964 | Hendricks | 340—35 |
| 3,126,522 | 3/1964 | Fieser | 340—39 |
| 3,174,131 | 3/1965 | Hendricks | 340—35 |

FOREIGN PATENTS 992,198 10/1951 France.

NEIL C. READ, *Primary Examiner.*

T. B. HABECKER, *Assistant Examiner.*